United States Patent
Seo et al.

(10) Patent No.: US 7,054,633 B2
(45) Date of Patent: May 30, 2006

(54) APPARATUS AND METHOD FOR TRANSMITTING AND RECEIVING UPLINK POWER OFFSET INFORMATION IN A MOBILE COMMUNICATION SYSTEM SUPPORTING HSDPA

(75) Inventors: Myeong-Sook Seo, Suwon-shi (KR); Ju-Ho Lee, Suwon-shi (KR); Sung-Ho Choi, Suwon-shi (KR); Yong-Jun Kwak, Yongin-shi (KR); Kook-Heui Lee, Yongin-shi (KR); Joon-Goo Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 403 days.

(21) Appl. No.: 10/370,401

(22) Filed: Feb. 19, 2003

(65) Prior Publication Data

US 2003/0232622 A1    Dec. 18, 2003

(30) Foreign Application Priority Data

Feb. 17, 2002    (KR) .................. 10-2002-0008873

(51) Int. Cl.
*H04Q 7/20*    (2006.01)
(52) U.S. Cl. .................. 455/439; 455/436; 455/522; 455/69; 370/331; 370/338; 370/349
(58) Field of Classification Search ................ 455/439, 455/436, 522, 69; 370/331, 338, 349
See application file for complete search history.

(56) References Cited

U.S. PATENT DOCUMENTS

| | | | |
|---|---|---|---|
| 2002/0172208 A1* | 11/2002 | Malkamaki | 370/400 |
| 2003/0013443 A1* | 1/2003 | Willars et al. | 455/432 |
| 2003/0099249 A1* | 5/2003 | Heijenk | 370/412 |
| 2003/0099255 A1* | 5/2003 | Kekki et al. | 370/469 |
| 2003/0147370 A1* | 8/2003 | Wu | 370/338 |
| 2003/0214922 A1* | 11/2003 | Shahrier | 370/331 |

FOREIGN PATENT DOCUMENTS

| | | |
|---|---|---|
| WO | WO 96/38014 | 11/1996 |
| WO | WO 99/31819 | 6/1999 |
| WO | WO 01/05179 | 1/2001 |
| WO | WO 02/01893 | 1/2002 |
| WO | WO 02/082666 | 10/2002 |
| WO | WO 03/044989 | 5/2003 |
| WO | WO 03/049320 | 6/2003 |

\* cited by examiner

*Primary Examiner*—Danh Cong Le
(74) *Attorney, Agent, or Firm*—Dilworth & Barrese LLP

(57) ABSTRACT

A radio network controller (RNC) transmits a power offset for controlling transmission power of an uplink high-speed dedicated physical control channel (HS-DPCCH) when a user equipment (UE) enters a handover region, in a mobile communication system including the RNC, a Node B connected to the RNC, and the UE located in one of at least two cell areas occupied by the Node B. The Node B transmits data to the UE over a high-speed downlink shared channel (HS-DSCH) and the UE transmits information indicating reception of the data to the Node B over the uplink HS-DPCCH. The RNC informs the UE of a power offset for determining a transmission power increment of the uplink HS-DPCCH, if it is determined that the UE is located in the handover region. The RNC informs the Node B of the power offset so that the Node B can determine a threshold value for determining information indicating reception of the data, depending on the power offset.

29 Claims, 22 Drawing Sheets

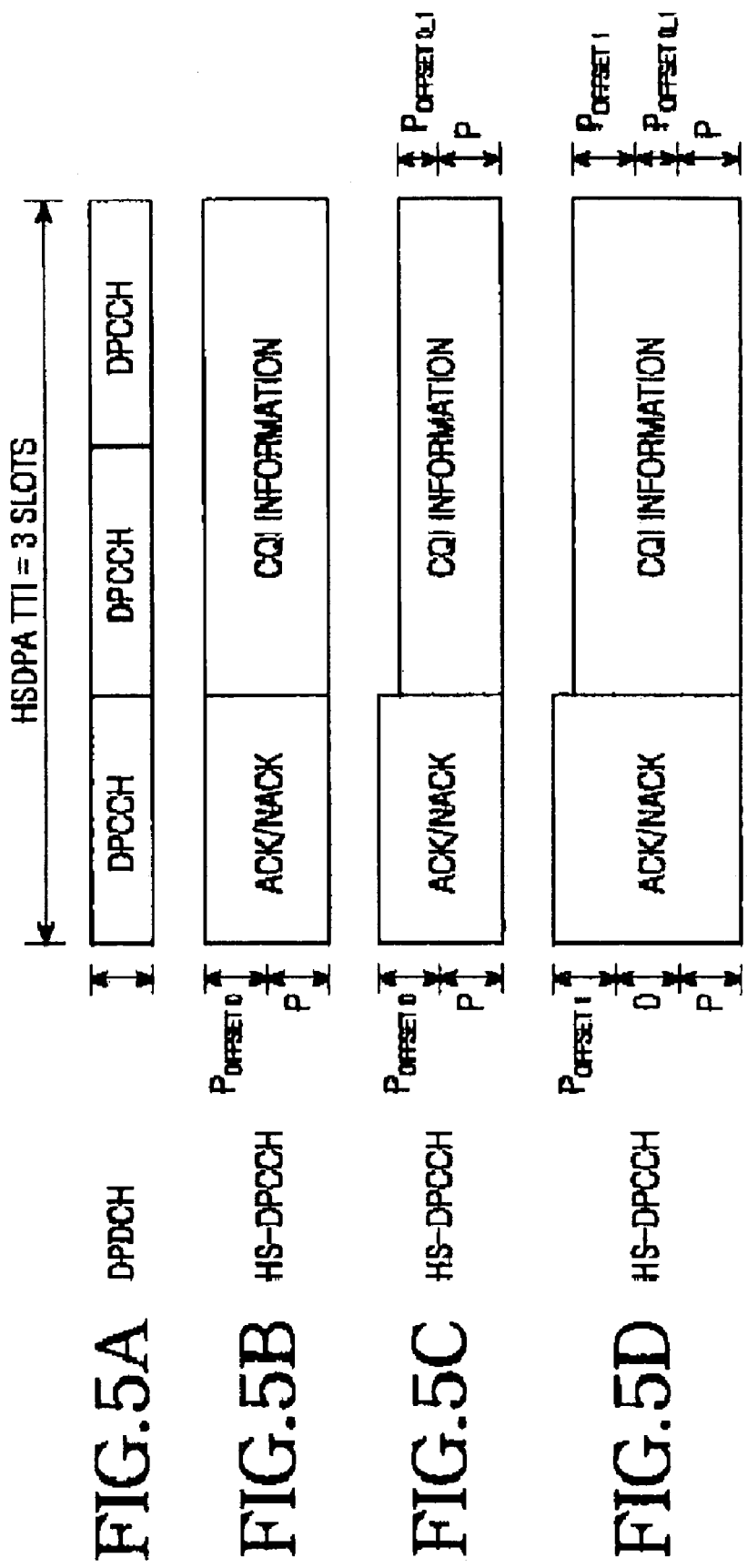

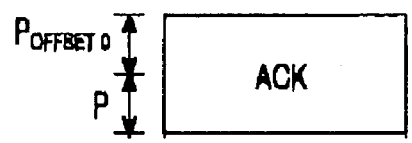
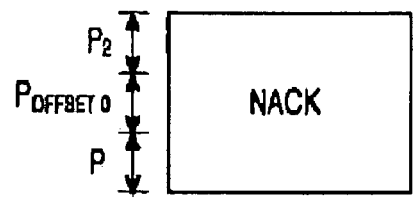
FIG.6A  FIG.6B
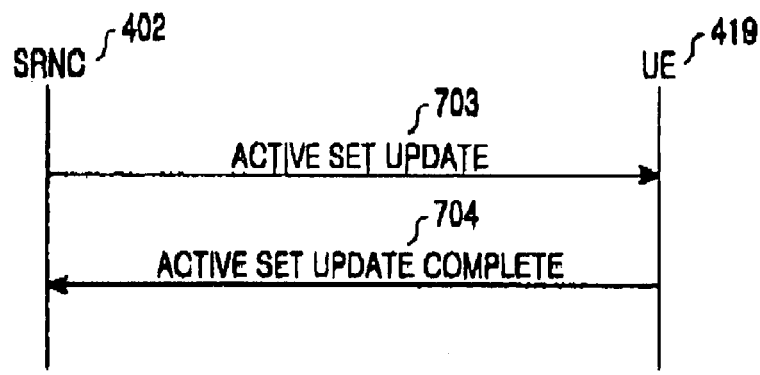
FIG.7

(c)

APPARATUS AND METHOD FOR TRANSMITTING AND RECEIVING UPLINK POWER OFFSET INFORMATION IN A MOBILE COMMUNICATION SYSTEM SUPPORTING HSDPA

PRIORITY

This application claims priority under 35 U.S.C. § 119 to an application entitled "Apparatus and Method for Transmitting and Receiving Uplink Power Offset Information in a Mobile Communication System Supporting HSDPA" filed in the Korean Industrial Property Office on Feb. 17, 2002 and assigned Serial No. 2002-8873, the contents of which are incorporated herein by reference.

BACKGROUND OF THE INVENTION

1. Field of the Invention

The present invention relates generally to a power control apparatus and method for a high-speed dedicated physical control channel in a mobile communication system supporting a high-speed downlink packet access (HSDPA) service, and in particular, to an apparatus and method for transmitting and receiving an uplink power offset value to transmit a high-speed dedicated physical control channel.

2. Description of the Related Art

HSDPA brings high-speed data delivery to user equipments (UEs) over a high-speed-downlink shared channel (HS-DSCH) and its related control channels. To support HSDPA, adaptive modulation and coding (AMC), hybrid automatic retransmission request (HARQ), and fast cell selection (FCS) have been proposed.

A. AMC

AMC is a technique for adapting a modulation and encoding format based on a received signal quality of a UE and a channel condition between a particular Node B and the UE to increase a use efficiency of an entire cell. Therefore, the AMC involves a plurality of modulation and encoding schemes (MCSs). MCS levels are set from level 1 to level n for AMC. In other words, the AMC is an adaptive selection of an MCS level according to the channel condition between the UE and the serving Node B.

B. HARQ

In HARQ, particularly n-channel SAW HARQ (n-channel Stop And Wait HARQ), two techniques are introduced to increase typical ARQ efficiency. That is, a retransmission request and a response for the retransmission request are exchanged between the UE and the Node B, and defective data is temporarily stored and combined with corresponding retransmitted data. The n-channel SAW HARQ has been introduced to overcome the shortcomings of conventional SAW ARQ in HSDPA. In the SAW ARQ, a next packet data is not transmitted until an acknowledgement (ACK) signal is received for previously transmitted packet data. This implies that even though the packet data can be transmitted, the ACK signal must be awaited. On the other hand, the n-channel SAW HARQ enables successive transmission of next packet data without receiving an ACK signal for transmitted packet data, thereby increasing channel use efficiency. If n logical channels are established between a UE and a Node B, and are identified by specific time or their channel numbers, the UE can determine a channel on which packet data has been transmitted at an arbitrary point in time. Also, the UE can rearrange packet data in a correct reception order or soft-combine corresponding packet data.

C. FCS

FCS is a technique for fast selecting a cell (hereinafter, referred to as a best cell) at the best condition among a plurality of cells when a UE supporting HSDPA is at a soft-handover zone, which is defined as an overlapped zone between Node Bs. When the UE enters the soft-handover region, it establishes radio links with the Node Bs. The cells of the Node Bs that have established radio links with the UE are the active set of the UE. The UE receives data only from the best cell in the active set, thereby reducing overall interference. The UE periodically monitors the channel conditions with the cells in the active set to determine if there is a cell better than the present best cell. If there is better a cell, the UE transmits a Best Cell Indicator (BCI) to the cells of the active set to change the best cell. The BCI contains an identifier (ID) of the new best cell. Upon receipt of the BCI, the cells determine whether the BCI indicates one of them. Then, the new best cell transmits an HSDPA packet to the UE on the HS-DSCH.

FIG. 1 schematically illustrates a conventional downlink channel structure of a mobile communication system supporting an HSDPA service (hereinafter, referred to as an "HSDPA mobile communication system"). Referring to FIG. 1, a downlink channel for a mobile communication system supporting HSDPA (hereinafter, referred to as a "HSDPA mobile communication system" for short) includes a downlink dedicated physical channel (DL_DPCH), a downlink shared control channel (DL_SHCCH) and an HS-DSCH.

The DL_DPCH transmits information required for an existing code division multiple access (CDMA) system (for example, a Rlease-99 system), and an HS-DSCH indicator (HI) indicating whether there is HSDPA packet data to transmit. The HI can be used in indicating SHCCH that a corresponding UE must receive the HSPDA packet data.

For example, when the HSDPA packet data is transmitted by the N (=N1+N2) slots (i.e., by the HSDPA transmission time interval (TTI)), the HI is partially transmitted for N1 slots and a part for transmitting the HI for the remaining N2 slots is subject to discontinuous transmission (DTX). However, if there is no HSDPA packet data to transmit, a part for transmitting HI of all slots constituting one TTI is DTX-processed. In this case, however, it is assumed that a slot format is fixed in the TTI. When the HSDPA packet data is transmitted by the 3 slots (i.e., one HSDPA TTI=3 slots), the HI is transmitted over a particular one of the 3 slots.

The SHCCH transmits control information needed by a corresponding UE to receive HSDPA packet data over the HS-DSCH. HS-DSCH control information transmitted over the SHCCH includes:

(1) Transport Format and Resource related Information (TFRI): this represents an MCS level and HS-DSCH channelization code information to be used for HS-DSCH, a size of a transport block set, and an identifier of a transport channel.

(2) HARQ information: this represents information needed to support HARQ.

(a) HARQ processor number: in n-channel SAW HARQ, this indicates a channel to which specific packet data belongs among logical channels for HARQ.

(b) HARQ packet number: in FCS, if a best cell is changed, this informs a UE of a unique number of downlink packet data so that the UE can inform a selected new best cell of a transmission state of the HSDPA data.

The SHCCH can be assigned one or two or more channelization codes. FIG. 1 illustrates an example where a maximum of 4 SHCCHs can be assigned. In this case, information on SHCCH that a corresponding UE must receive can be represented by a 2-bit HI. For example, the UE receives SHCCH#1 for HI=00, SHCCH#2 for HI=01, SHCCH#3 for HI=10; and SHCCH#4 for HI=11.

The HS-DSCH is used to transmit the HSDPA packet data. The HS-DSCH, because it transmits high-speed packet data, is assigned an orthogonal variable spreading factor (OVSF) code with a very low spreading factor (SF). For example, an SF=16 OVSF code can be assigned to the HS-DSCH.

A description will be made herein below of a process of receiving by the UE an HSDPA service using the above-stated three downlink channels of DL_DPCH, SHCCH, and HS-DSCH.

The UE receives a DL_DPCH signal and analyzes an HI field of the received DL_DPCH signal. If the HI field was DTX-processed, the UE waits until a next TTI without receiving any SHCCH, determining that there is no HSDPA packet data. However, if it is analyzed that the HI field has a specific bit value, the UE receives an SHCCH signal according to the specific bit value, determining that there is HSDPA packet data. Thereafter, the UE extracts an MCS level, channelization code information, and HARQ related control information necessary for demodulation of HS-DSCH, by decoding the received SHCCH signal. The UE receives an HS-DSCH signal, and demodulates and decodes the received HS-DSCH signal using the extracted control information.

As described above, in order to demodulate an HS-DSCH signal, the UE first determines control information by receiving a DL_DPCH signal and an SHCCH signal. Therefore, in FIG. 1, start points of the DL_DPCH and the SHCCH go in advance of a start point of the HS-DSCH.

FIG. 2 illustrates a structure of a DL_DPCH determined by adding an HI field for an HSDPA service to fields for an existing downlink data service. Referring to FIG. 2, files for the existing downlink data service include a first data field Data1, a transmit power control (TPC) field, a transmit format combination indicator (TFCI) field, an HI field, a second data field Data2, and a Pilot field. The first and second data fields Data1 and Data2 are used to transmit data supporting an operation of an upper layer or data supporting a dedicated service, such as a voice service. The TPC field transmits a downlink power control command for controlling transmission power of a UE, and the TFCI field transmits transmit format combination indicator information for the first and second data fields. The Pilot field transmits a pilot signal, as a previously agreed symbol stream, for estimating a condition of a downlink channel by a UE. The HI field for the HSDPA service can be created by puncturing, for example, a part of the first or second data field.

FIG. 3 schematically illustrates a structure of conventional uplink dedicated physical channels in an HSDPA mobile communication system. Referring to FIG. 3, an uplink dedicated physical channel includes an uplink dedicated physical data channel (UL_DPDCH), an uplink dedicated physical control channel (UL_DPCCH), and an uplink high-speed dedicated physical control channel (HS-DPCCH) for supporting an HSDPA service. The uplink dedicated physical channels are assigned unique channelization codes, for separate management. That is, for the HSDPA service, HS-DPCCH is defined as a new uplink control channel by assigning a channelization code instead of modifying the existing uplink control channel. This solves a compatibility problem with an existing system and a complexity problem of a channel structure, which may occur when the existing uplink channel is modified. The reason that HS-DPCCH can be newly assigned for the HSDPA service as stated above is because in the case of an uplink, channelization code resources are so sufficient that OVSF codes can be assigned to all UEs.

The UL_DPDCH transmits upper layer data by the slot (or slot by slot), and the UL_DPCCH transmits a Pilot symbol, TFCI bits, a feedback information (FBI) symbol, and a TPC symbol by the slot. The Pilot symbol is used as a signal for estimating a condition of an uplink channel by a Node B, and the TFCI bits represent a transmit format combination of data transmitted for a current frame. The FBI symbol represents feedback information when a transmit diversity technology is used, and the TPC symbol is used to control transmission power of a downlink channel. A spreading factor (SF) of OVSF codes used for the UL_DPCCH is fixed to 256.

The HS-DPCCH transmits a response signal based on whether an error has occurred in received high-speed packet data, and channel quality indicator (CQI) information. The response signal is divided into an acknowledgement signal (ACK) indicating non-occurrence of an error and a negative acknowledgement signal (NACK) indicating occurrence of an error. The CQI information is provided to a Node B by a UE to support AMCS for the HSDPA service. If it is assumed that 3 slots constitute one TTI, the ACK/NACK is transmitted over one of the three slots, and the CQI information is transmitted over the remaining two slots. Transmission of the ACK/NACK or CQI information is not required. The ACK/NACK field or CQI field can be subject to DTX during transmission.

FIG. 4 is a diagram illustrating a UE located in a handover state in a general $3^{rd}$ generation asynchronous mobile communication system. It is assumed in FIG. 4 that 3 Node Bs exist in an active set of a UE, and of the 3 Node Bs, a Node B#1 405 and a Node B#2 406 belong to the same radio network controller (RNC) 402 and a Node B#3 420 belongs to another RNC 404. In FIG. 4, a radio network system (RNS) refers to an RNC and Node Bs controlled by the RNC in the $3^{rd}$ generation asynchronous mobile communication standard. An RNS A 401 includes the RNC A 402 and its associated Node B#1 405 and Node B#2 406 controlled by the RNC A 402. RNS B 403 includes the RNC B 404 and its associated Node B#3 420 controlled by the RNC B 404. It is assumed herein that the RNC A 402 is a serving RNC (SRNC) and the RNC B 404 is a drift RNC (DRNC) 404. The "SRNC" refers to an RNC that manages a service of a corresponding UE and take charge of a connection with a core network (CN). Of RNCs handling data from the corresponding UE, all RNCs except an SRNC are called a "DRNC."

A detailed operation performed by a UE in a handover state will be made with reference to FIG. 4. Referring to FIG. 4, a UE 419 moves away from a cell #1 407 while receiving an HSDPA service through downlink channels 411 of DL_DPCH SHCCH, and HS-DSCH. Of course, the UE 419 transmits DPDCH, DPCCH, and HS-DPCCH over an uplink. In this case, the UE 419 performs soft handover, if strength of a signal received from another cell along with a signal from the cell #1 407 is high enough. The UE 419 continuously monitors signals received from several cells and includes (or registers) cells with high signal strength in an active set. As a result, the UE 419 includes a cell #2 408, a cell #3 409 of the Node B#2 406 and a cell #4 of the Node B#3 420 in the active set, as illustrated in FIG. 4. As such, the UE 419 simultaneously receives signals from the other cells 408, 409, and 410 over DL_DPCHs 412, 413, and 414 along with the signal from the cell #1 407.

In this handover state, the UE 419 receives DL_DPCHs from the other cells #2, #3, and #4 in the active set as well as DL_DPCH, SHCCH, and HS-DSCH from the cell #1 407. That is, the UE 419 receives SHCCH and HS-DSCH for the HSDPA service only from the cell #1 407. This is because the HS-DSCH does not support soft handover. The reason is because in implementation, it is difficult for the other Node Bs 406 and 420 to analyze a packet data transmission state of the Node B#1 that transmits high-speed data, and subsequently transmit a data packet. The UE 419 performs soft combining on DL_DPCHs from the four cells 407, 408, 409 and 410, for analysis. The term "soft combining" refers to receiving by the UE 419 signals on different paths through corresponding fingers and combining the received signals. The soft combining attempts to reduce an influence of noises affecting a received signal by summing up the same information received through different paths, analyzing the summed information, and providing a multi-path diversity effect for the received signal to the UE. In a mobile communication system, power control is generally performed on channels between a Node B and a UE. However, power control over HS-DPCCH proposed for supporting the HSDPA service is not separately performed, but performed in the same manner as power control over the UL_DPCCH. In other words, DPCCH and HS-DPCCH have a constant power ratio, and if transmission power of the UL_DPCCH is increased or decreased due to power control, transmission power of the HS-DPCCH is also increased or decreased. The transmission power of the UL_DPCCH is controlled by TPC, a power control command transmitted over a TPC field of DL_DPCH. A problem on power control over HS-DPCCH, which may occur because of performing power control depending on a ratio of transmission power of the HS-DPCCH to transmission power of the DPCCH, will now be described with reference to FIG. 4.

Describing a common uplink power control process in the existing Release-99, a Node B receives a Pilot signal over UL_DPCCH and measures an uplink signal-to-interference ratio (SIR) by the received Pilot signal. The Node B compares the measured SIR with a target SIR and transmits TPC over DL_DPCH according to the comparison result. For example, if the measured SIR is lower than the target SIR, the Node B transmits to a UE a command for increasing uplink transmission power (hereinafter, referred to as a "power-up command") over a TPC field of DL_DPCH. However, if the measured SIR is higher than the target SIR, the Node B transmits a command for decreasing transmission power (hereinafter, referred to as a "power-down command").

Describing power control over an uplink channel in a handover state, a UE receives TPCs over DL_DPCHs from all Node Bs included in an active set. If at least one of the received TPCs includes a power-down command, the UE decreases transmission power of an uplink channel. For example, if the UE receives a power-up command from the cell #1 407 and power-down commands from the other Node Bs 406 and 420, the UE 419 decreases transmission power of the uplink channel. That is, even though the cell #1 407 supporting an HSDPA service continuously transmits a power-up command, the UE will decrease transmission power of the UL_DPCCH. This means that transmission power of the HS-DPCCH in power control is also decreased while maintaining a constant power ratio to the UL_DPCCH. The reason that such power control has not raised any problem conventionally is because the UL_DPDCH and the UL_DPCCH are transmitted to all cells within a handover region, so the RNC A 402, an upper layer, can perform combining. However, as the HS-DPCCH for the HSDPA service is received through only one cell 407, the RNC A 402 cannot perform combining. Therefore, the above-stated uplink power control may undesirably decrease reliability of the HS-DPCCH that transmits ACK/NACK and CQI information, which are important to the HSDPA service.

In order to solve this problem, it is necessary to provide a power control method different from the existing uplink power control when a UE is located in a handover region. For example, the UE transmits HS-DPCCH at transmission power increased by a predetermined value against the transmission power of UL_DPCCH.

To this end, a Node B compares a measured SIR with a target SIR, and determines that a UE is located in a handover region or has a poor channel condition, if the measured SIR is lower by a threshold value or higher than the target SIR. Thereafter, the Node B defines a difference between the measured SIR and the target SIR as an uplink power offset value of HS-DPCCH, and transmits the uplink power offset value to the UE. The UE then increases transmission power of HS-DPCCH by the uplink power offset value before transmission.

In order to perform power control as stated above, a detailed definition should be made of a method for determining the uplink power offset value and a method for transmitting the determined uplink power offset value to a UE. Generally, there is a method for transmitting by a Node B an uplink power offset value to a UE over a particular field of a physical channel. However, this method should always assign a fixed field to a physical channel even when it is not necessary to transmit an uplink power offset value, causing a decrease in utilization efficiency of resources.

SUMMARY OF THE INVENTION

It is, therefore, an object of the present invention to provide an apparatus and method for determining a power offset value of a high-speed dedicated physical control channel (HS-DPCCH) for a user equipment (UE) located in a handover region in an HSDPA mobile communication system.

It is another object of the present invention to provide a method for delivering a power offset value of an HS-DPCCH to a UE located in a handover region by a radio network controller (RNC) in an HSDPA mobile communication system.

It is further another object of the present invention to provide a method for delivering a power offset value of an HS-DPCCH for a UE located in a handover region to a Node B by an RNC in an HSDPA mobile communication system.

It is yet another object of the present invention to provide a method for transmitting a power offset value of an HS-DPCCH for a UE located in a handover region to the UE, using a Radio Resource Control message, by an RNC in an HSDPA mobile communication system.

It is still another object of the present invention to provide a method for transmitting a power offset value of an HS-DPCCH for a UE located in a handover region to a Node B, using a Node B application part (NBAP) message, by an RNC in an HSDPA mobile communication system.

It is still another object of the present invention to provide a method for transmitting a power offset value of an HS-DPCCH for a UE located in a handover region to a Node B, using a frame protocol, by an RNC in an HSDPA mobile communication system.

It is still another object of the present invention to provide a method for transmitting a power offset value of an HS- DPCCH for a UE located in a handover region to a Node B, using a data frame, by an RNC in an HSDPA mobile communication system.

It is still another object of the present invention to provide a method for transmitting a power offset value of an HS-DPCCH for a ULE located in a handover region to the UE through MAC-hs PDU by an RNC in an HSDPA mobile communication system.

To achieve the above and other objects, the present invention provides a method for transmitting by a radio network controller (RNC) a power offset for controlling transmission power of an uplink high-speed dedicated physical control channel (HS-DPCCH) when a user equipment (UE) enters a handover region as the UE moves from a current cell area toward a neighbor cell area, in a mobile communication system including the RNC, a Node B connected to the RNC, and the UE located in one of at least two cell areas occupied by the Node B, wherein the Node B transmits data to the UE over a high-speed downlink shared channel (HS-DSCH) and the UE transmits information indicating reception of the data to the Node B over the uplink HS-DPCCH. The method comprises informing the UE of a power offset for determining a transmission power increment of the uplink HS-DPCCH, if it is determined that the UE is located in the handover region; and informing the Node B of the power offset so that the Node B can determine a threshold value for determining information indicating reception of the data, depending on the power offset.

BRIEF DESCRIPTION OF THE DRAWINGS

The above and other objects, features, and advantages of the present invention will become more apparent from the following detailed description when taken in conjunction with the accompanying drawings in which:

FIGS. 5A to 5D illustrate examples of setting transmission power of uplink channels in an HSDPA mobile communication system;

FIGS. 6A and 6B illustrate examples of setting different transmission power for an ACK and a NACK transmitted over an HS-DPCCH in an HSDPA mobile communication system;

FIG. 7 illustrates signaling between an RNC and a UE, for transmitting an uplink power offset to the UE according to a first embodiment of the present invention;

DETAILED DESCRIPTION OF THE PREFERRED EMBODIMENT

Figure 1:
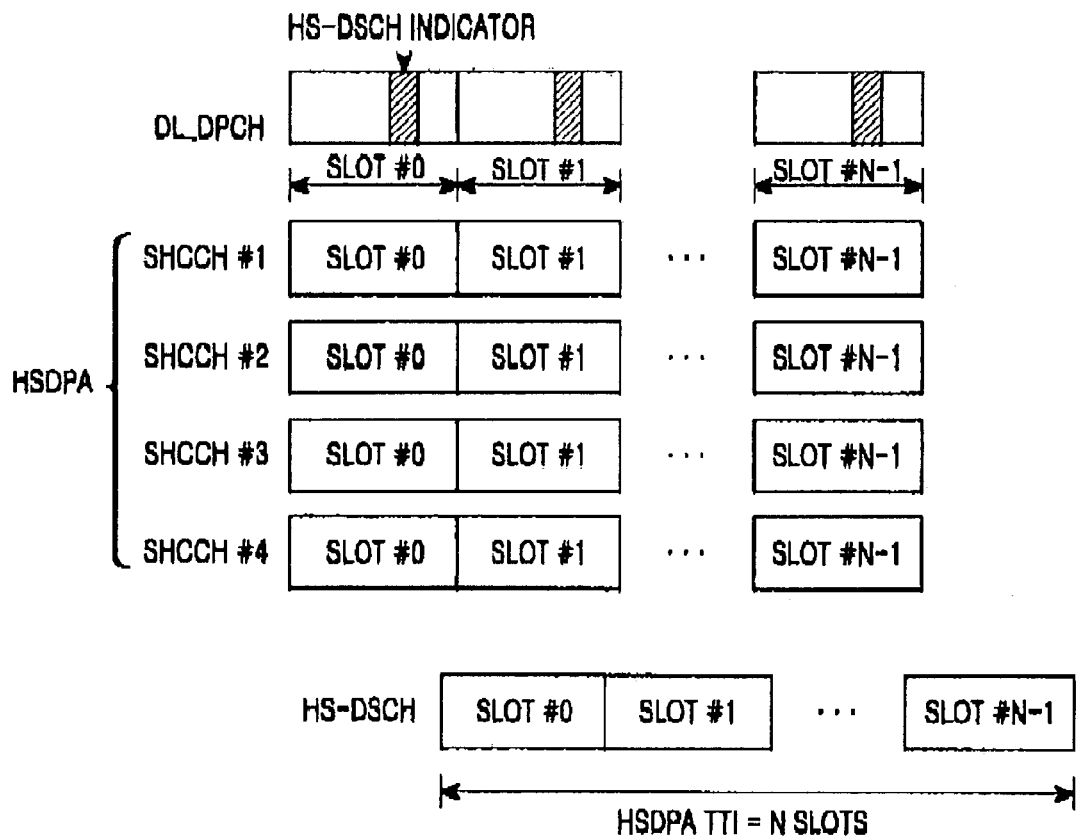
FIG. 1 illustrates a conventional downlink channel structure of an HSDPA mobile communication system.
Figure 2:
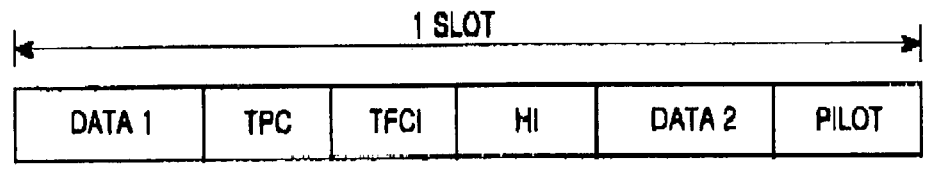
FIG. 2 illustrates a structure of the downlink dedicated physical channel illustrated in FIG. 1.
Figure 3:
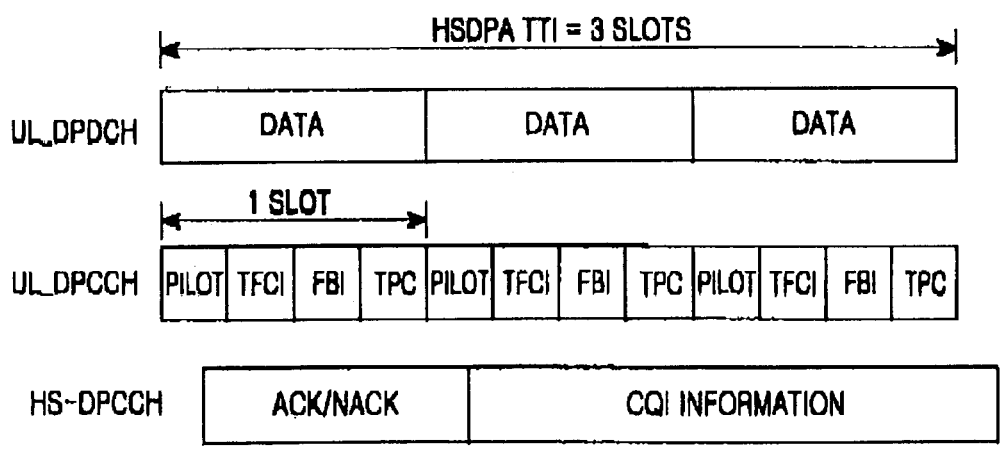
FIG. 3 illustrates a structure of conventional uplink dedicated physical channels in an HSDPA mobile communication system.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

A description will first be made of an exemplary method for applying an uplink power offset value according to an embodiment of the present invention with reference to FIGS. 5A to 6B.

FIGS. 5A to 5D illustrate setting transmission power of uplink channels of a UL_DPCCH and an HS-DPCCH in an HSDPA mobile communication system. Specifically, FIG. 5A illustrates an example of setting transmission power of an UL_DPCCH. Transmission power of the UL_DPCCH generally has a constant value within one slot, and is basically set to P (having a unit of dB). The P is a value determined by a quality of service (QoS) of the UL_D-PCCH. FIGS. 5B and 5C illustrate examples of setting transmission power of the HS-DPCCH for an HSDPA service regardless of handover. In FIG. 5B, transmission power of the HS-DPCCH has a constant ratio to the transmission power P of the UL_DPCCH illustrated in FIG. 5A. That is, the transmission power of the HS-DPCCH is determined by the sum of the transmission power P and a power offset value Poffset0 of the UL_DPCCH. FIG. 5B illustrates a case where ACK/NACK information and CQI information have the same Poffset0 within one TTI. However, in an actual UMTS (Universal Mobile Telecommunications System) terrestrial radio access network (UTRAN), the ACK/NACK information and the CQI information may require different QoSs. FIG. 5C illustrates an example of assigning higher transmission power to ACK/NACK that requires higher QoS as compared with the CQI information. That is, a power offset value Poffset0 for the ACK/NACK is set to a value different from a power offset value Poffset0_1 for the CQI information. Determining whether the transmission power for the HS-DPCCH is to be set in the method illustrated in FIG. 5B or FIG. 5C should be previously agreed between a UTRAN and a UE. However, when transmission power of the HS-DPCCH is set in the method illustrated in FIG. 5B or FIG. 5C in a handover region, there may be a case where reception power of HS-DPCCH at a Node B is not proper.

FIG. 5D illustrates an example of additionally increasing transmission power of the HS-DPCCH in a handover region in order to solve such a problem. That is, FIG. 5D illustrates a method for additionally applying a power offset value Poffset1 to the basic transmission power of HS-DPCCH, set in the method illustrated in FIG. 5C, if a UE is located in a handover region. As a result, transmission power of both ACK/NACK and CQI information is increased by Poffset1. Although the same power offset value Poffset1 is set for both the ACK/NACK and the CQI information in FIG. 5D, it is also possible to set different power offset values for the ACK/NACK and the CQI information according to a required QoS. For simplicity of description, it will be assumed herein that the same power offset value is set for the ACK/NACK and the CQI information as illustrated in FIG. 5D.

FIGS. 6A and 6B illustrate examples of setting different transmission power for an ACK and a NACK transmitted over an HS-DPCCH. In an actual UTRAN, a required QoS is set to a different value according to whether ACK/NACK information is ACK or NACK. In general, although a UE has transmitted ACK in response to high-speed packet data received from a Node B supporting an HSDPA service, the Node B may mistake the ACK for NACK. In this case, the system is not considerably affected. This is because if a Node B mistakes the ACK for a NACK, the Node B generates only an overhead for retransmitting the previously received error free high-speed packet data. In contrast, although a UE has transmitted the NACK, a Node B may mistake the NACK for ACK. In this case, the system is considerably affected. This is because the UE cannot receive reception-failed high-speed packet data any longer. For these reasons, the UTRAN requires higher QoS for the NACK as compared with the ACK. Therefore, although basic transmission power for an ACK/NACK becomes the sum of P and Poffset0 as illustrated in FIGS. 5B or 5C, transmission power actually separately applied to ACK and NACK will have the values illustrated in FIGS. 6A and 6B.

FIG. 6A illustrates an example of setting transmission power of ACK. In FIG. 6A, where the ACK/NACK information is ACK, its transmission power is expressed as the sum of P and Poffset0 by applying the methods illustrated in FIGS. 5B and 5C. In FIG. 6B, where the ACK/NACK information is a NACK, its transmission power becomes a value determined by adding a power offset value P2 to the sum of P and Poffset0 by applying the methods illustrated in FIGS. 5B and 5C, because the NACK requires a higher QoS than that of the ACK.

Summarizing the invention described in conjunction with FIGS. 5A to 6B, because there may be a case where transmission power of HS-DPCCH is not proper when a UE is located in a handover region or has a poor channel condition, transmission power of the HS-DPCCH is set using a separate power offset. In order to set transmission power of the HS-DPCCH by applying a power offset value, the UE must have information on the power offset value. Therefore, a method for informing a UE of the power offset value by a UTRAN is required.

The present invention proposes two methods for determining by a UTRAN a power offset value and informing a UE of the determined power offset value. In a first method, an RNC determines whether a UE is located in a handover region, and informs the UE and a Node B of separate power offset information through upper layer signaling, only when the UE is located in the handover region. In a second method, a Node B measures reception power of an HS-DPCCH received, and transmits a power offset value determined based on the measured reception power through a MAC-hs (Medium Access Control-high speed) PDU (Packet Data Unit) for an HSDPA service.

Herein below, detailed descriptions of embodiments of the present invention will be made with reference to the accompanying drawings.

Embodiment #1

Figure 4:
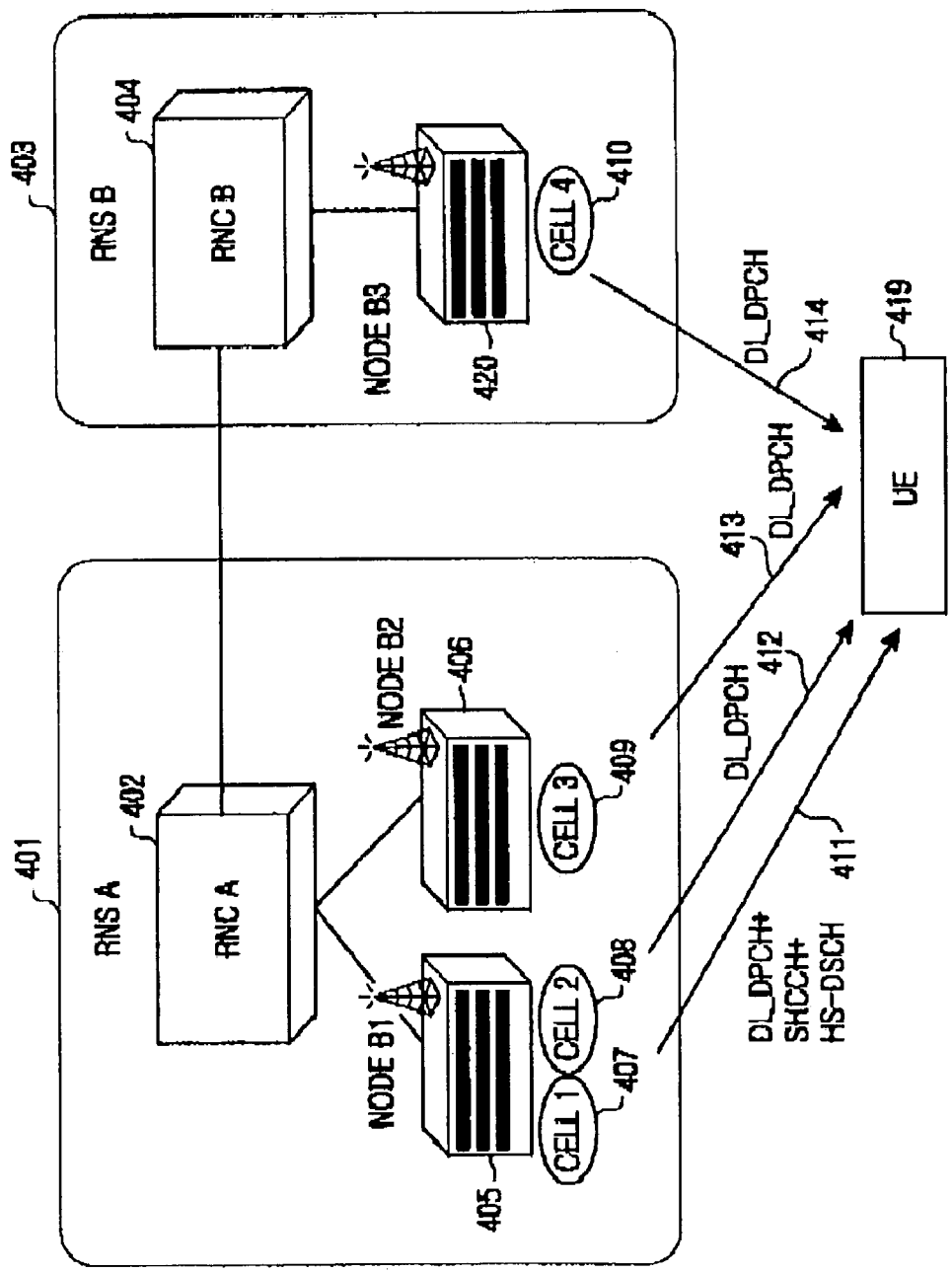
FIG. 4 is a diagram for explaining a situation where a UE in a handover state requires an uplink power offset.

A first method will be described herein below in conjunction with a first embodiment. For the sake of simplicity, the first embodiment will be described on the assumption that a UE is in a handover state. In most cases, transmission power of an HS-DPCCH is not proper when a UE is located in a handover region. Referring to FIG. 4, the RNC A 402, an SRNC, has information on whether the UE 419 is located in a handover region and on each radio path. The "radio path" represents a path between a cell and a UE, and a set of cells that can transmit signals to the UE 419 is called an "active set." That is, in FIG. 4, the cell #1 407, the cell #2 408, the cell #3 409, and the cell #4 410 belong to an active set.

The SRNC can determine whether a UE is located in a handover region, through reporting from the UE. Specifically, a UE constantly measures reception power for its neighbor Node B through a common pilot channel (CPICH). As the UE 419 moves away from the cell #1 407 and moves closer to the cell #2 408, reception power measured from CPICH of the cell #1 407 is decreased more and more, and reception power measured from CPICH of the cell #2 408 is increased more and more. If the reception power of the cell #2 408 is higher by a predetermined value than the reception power of the cell #1 407, it is said in WCDMA standard that an event 1A has occurred. The "event 1A" represents that a radio path from the cell #2 408 should be added to an active set. The UE 419 informs a UTRAN of an occurrence of the event 1A by reporting a measurement result (Measurement Report) using a physical random access channel (PRACH). If a DPCH is set up, the measurement result may also be reported through the DPCH. The PRACH is randomly accessed by each UE in an additive links online Hawaii area (ALOHA) under the current standard. Unlike the DPCH, the PRACH has a collision problem, so there is a case where it cannot transmit a measurement result report with reliability. Therefore, the PRACH operates in an acknowledged mode (AM) to reliably transmit a measurement result report. That is, if a measurement result report is not correctly transmitted to a UTRAN over the PRACH, the UTRAN sends a retransmission request to a UE so that the UE retransmits the measurement result report until it is correctly transmitted. If the cell #1 407 correctly receives the measurement result report from the UE 419, it delivers the received measurement result report to the RNC A 402.

As described above, because a separate power offset is required for an HS-DPCCH when a UE is located in a handover region, a method for informing the UE 419 of the power offset value by the RNC A 402 is required.

In the 3GPP ($3^{rd}$ generation partnership project) standard, when a new radio path for a DPCH is added or deleted, an SRNC transmits information on all radio paths to a UE through an Active Set Update message, and the UE then transmits an Active Set Update Complete message in response to the Active Set Update message. In the present invention, the SRNC transmits the separate power offset value to the UE through an upper layer message, called an "Active Set Update message."

1. Transmission of a Power Offset for an HS-DPCCH to a UE

FIG. 7 illustrates providing a power offset value of an HS-DPCCH from the SRNC 402 to the UE 419 according to an embodiment of the present invention. As illustrated, the SRNC 402 transmits a power offset value to the UE 419 through an Active Set Update message 703, and the UE 419 transmits an Active Set Update Complete message 704 to the SRNC 402 in response to the Active Set Update message 703.

Table 1 below illustrates an example of the Active Set Update message 703.

TABLE 1

Active Set Update

UE information elements
>Activation time
Downlink radio resources
>Radio link addition information
>>Primary CPICH info
>>Downlink DPCH info for each RL
Uplink radio resources
>Maximum allowed UL TX power
>HS-DPCCH power offset First, the Active Set Update message 703 transmits Activation time indicating an absolute time when the UE 419 starts receiving a radio path added or deleted. When the radio path is added, i.e., when the UE 419 is handed over as it moves toward the cell #2 408, the SRNC 402 transmits information on each of forward links to the UE 419. A message transmitted to the UE 419 includes Primary CPICH info representing CPICH information of the cell #2 408, and Downlink DPCH info for each RL representing DPCH information of each path.

Each time an active set is updated, the UE 419 is informed of an uplink channel resource, and a message for the uplink channel resource includes Maximum allowed UL TX power representing maximum uplink transmission power. In addition, the Active Set Update message can transmit an HS-DPCCH power offset message used by the SRNC 402 to transmit a power offset value of an HS-DPCCH according to the first embodiment of the present invention to the UE 419. When the UE 419 is not located in a handover region as described in conjunction with FIGS. 5B and 5C, transmission power of an HS-DPCCH is basically set to a value determined by adding Poffset0 to transmission power of a UL_DPCCH. When the UE 419 is located in a handover region, the SRNC 402 transmits an HS-DPCCH power offset message to the UE 419 through the Active Set Update message 703. Then, as illustrated in FIG. 5D, the UE 419 increases transmission power of HS-DPCCH by the sum of P, Poffset0 and Poffset1, and transmits the HS-DPCCH at the increased transmission power at the Activation time. The Poffset1 added when the UE 419 is in a handover state will be determined through experiment, thereby satisfying a proper QoS. Although Table 1 shows only the messages necessary for description of the present invention, additional messages may be included in the Active Set Update message when necessary. After receiving the message of Table 1 and successfully updating an active set, the UE 419 transmits an Active Set Update Complete message 704 to the SRNC 402.

2. Transmission of Power Offset for HS-DPCCH to Node B

As described above in conjunction with FIG. 7, the SRNC 402 controls transmission power of the HS-DPCCH by directly signaling a power offset value of the HS-DPCCH to the UE 419. In this case, in order to extract ACK/NACK information of the HS-DPCCH, a Node B should have information on the power offset value. The reason that the Node B should have information on the power offset value will be described in detail with reference to FIGS. 8A to 8C.

After an HI is transmitted over a DL_DPCH, if high-speed packet data is transmitted to a UE over an HS-DSCH, the UE will transmit ACK/NACK information over an HS-DPCCH after error checking on the received high-speed packet data. If the HI is not transmitted, the UE DTX-processes an ACK/NACK field of the HS-DPCCH, determining that there is no high-speed packet data to receive. Therefore, assuming that the UE has correctly decoded the HI, a Node B can exactly predict transmission of the ACK/NACK information according to presence/absence of the HI. When transmission of the ACK/NACK information is predicted, the Node B simply determines whether the ACK/NACK information is an ACK or a NACK.

Figure 8A:
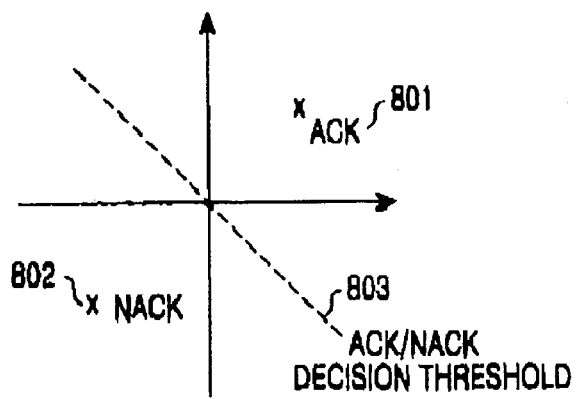
FIGS. 8A to 8C illustrate examples of determining by a Node B a decision threshold line for determining an ACK/NACK transmitted over an HS-DPCCH in an HSDPA mobile communication system.
Figure 8B:
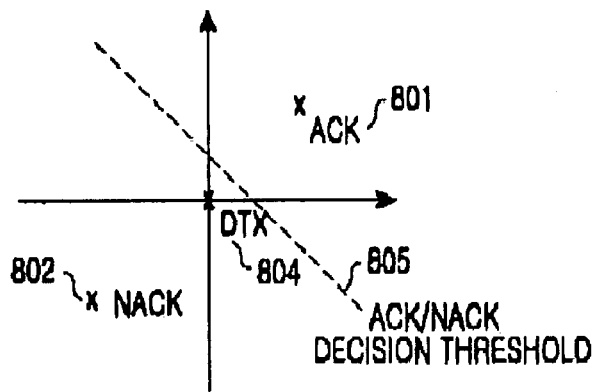
Figure 8C:
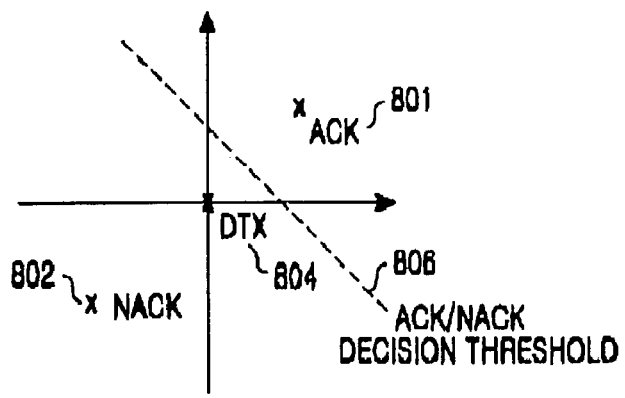

FIGS. 8A to 8C illustrate examples of determining by a Node B a decision threshold line for determining an ACK/NACK transmitted over an HS-DPCCH. Specifically, FIG. 5A illustrates a decision threshold line for determining an ACK/NACK when a Node B can predict transmission of the ACK/NACK on the assumption that a UE has correctly extracted an HI. The Node B can determine whether information transmitted over an ACK/NACK field of an HS-DPCCH is an ACK 801 or a NACK 802 on the basis of a decision threshold line 803.

However, there may be a case where a UE incorrectly determines that an HI has not been transmitted, due to a failure in decoding the HI. In this case, the UE will DTX-process an ACK/NACK field of HS-DPCCH because of receiving no high-speed packet data. Therefore, a Node B should determine whether ACK/NACK information is ACK or NACK, considering the DTX. That is, since the ACK/NACK field of the HS-DPCCH is used to transmit DTX as well as ACK/NACK information, if the ACK/NACK determination is made on the basis of the decision threshold line 803 in FIG. 8A, there is a high probability that DTX will be mistaken for an ACK. In this case, a Node B incorrectly determines that high-speed packet data has normally transmitted to a UE even though it is not correctly transmitted.

Providing for such an error occurring in an HI, a Node B is required to determine an ACK/NACK decision threshold line as illustrated in FIG. 8B. FIG. 8B illustrates a decision threshold line for determining the ACK/NACK by taking into consideration a case where a UE is not located in a handover region and an ACK/NACK field is DTX-processed by the UE during transmission. As illustrated in FIG. 8B, a decision threshold line 805 for determining ACK/NACK can be shifted toward ACK 801 in order to decrease a probability that a Node B will mistake DTX 804 for ACK 801. That is, the Node B is allowed to determine the DTX 804 as a NACK 802 instead of the ACK 801. By determining the decision threshold line 805 in this way, high-speed packet data not transmitted to a UE due to an HI error can be retransmitted by the Node B.

FIG. 8C illustrates an ACK/NACK decision threshold line determined by taking into consideration a case where a UE located in a handover region increases transmission power of an ACK/NACK information by a power offset proposed by the invention during transmission. According to the present invention, transmission power of an ACK 801 and a NACK 802 when a UE is located in a handover region will be higher by a power offset than transmission power of the ACK 801 and the NACK 802 when a UE is not located in a handover region. Therefore, a decision threshold line 806 for determining the ACK 801 and the NACK 802 moves further away from the origin of coordinates, compared with the decision threshold line 805 illustrated in FIG. 8B. As can be understood from the foregoing description, a decision threshold line for determining the ACK 801 and the NACK 802 should be changed according to whether a power offset is applied. Therefore, since a Node B must have information on whether a power offset of HS-DPCCH is applied or not in order to determine a preferable decision threshold line for determining the ACK/NACK, an SRNC must transmit a power offset value to a UE, and at the same time, also transmit the power offset value to a Node B managing an HSDPA service.

A detailed description will now be made of two methods for transmitting a power offset value from an SRNC to a Node B according to an embodiment of the present invention, with reference to the accompanying drawings.

In a first method, an SRNC transmits a power offset value to a Node B, using a Node B application part (NBAP) message, which is a signaling message between the Node B and the SRNC. In a second method, an SRNC transmits a power offset value to a Node B along with an HS-DSCH. Here, it is considered that the power offset value can be transmitted using a frame protocol that will be described below.

A detailed description of the first method will first be made herein below.

As described in conjunction with FIG. 4, if it is assumed that the RNC A 402 to which the Node B#1 405 managing an HSDPA service belongs; is an SRNC, the RNC A 402 can transmit a power offset value to the Node B#1 405 only through an NBAP message. If it is assumed that the RNC A 402, to which the Node B#1 405 belongs, is a DRNC and the RNC B 404 is an SRNC, then the RNC B 404 must inform the RNC A 402 of a power offset value, using a radio network subsystem application part (RNSAP) message, which is a signaling message between RNCs. The RNC A 402 then informs the Node B#1 405 of the power offset value, using an NBAP message. For the sake of simplicity, a signaling message will be described herein considering only the case where the RNC A 402 is an SRNC.

Figure 9:
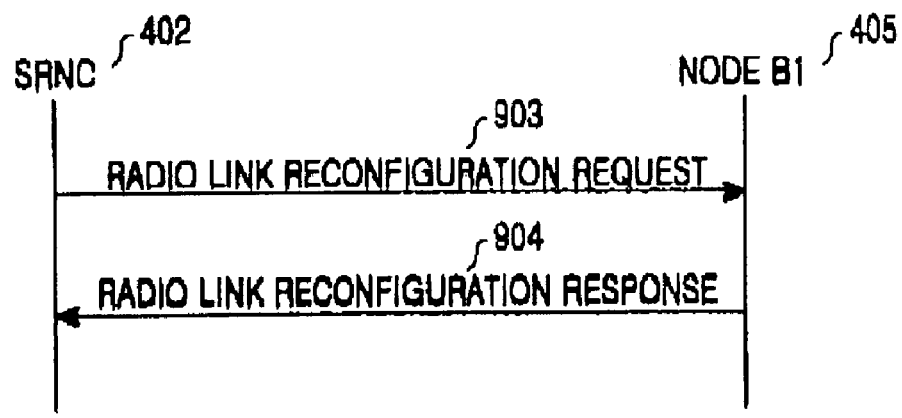
FIG. 9 illustrates signaling between an RNC and a Node B, for transmitting an uplink power offset to the Node B according to the first embodiment of the present invention.

FIG. 9 illustrates an example of signaling that provides a power offset value through an NBAP message from the RNC A 402, an SRNC, to the Node B#1 405. In FIG. 9, a Radio Link Reconfiguration Request message is used as an NBAP message for transmitting a power offset value.

The SRNC 402 transmits a Radio Link Reconfiguration Request message 903 to the Node B#1 405. The Radio Link Reconfiguration Request message includes a power offset value. The Node B#1 405 can reconfigure a channel resource by the power offset value. The Node B#1 405 transmits a Radio Link Reconfiguration Response message 904 to the SRNC 402 in response to the Radio Link Reconfiguration Request message 903.

Illustrated in Table 2 are parameters included in the Radio Link Reconfiguration Request message 903.

TABLE 2

| IE/Group Name |
|---|
| UL DPCH Information |
| >TFCS |
| UL HS-DPCCH Information |
| >HS-DPCCH power offset |
| DL DPCH Information |
| >TFCS |
| >TFCI Signaling Mode |

As illustrated in Table 2, parameters included in the Radio Link Reconfiguration Request message can be divided into UL_DPCH information, UL_HS-DPCCH information, and DL_DPCH information. The UL_DPCH information includes a TFCS parameter indicating a transmit format combination of the UL_DPCH. The DL_DPCH information includes a TFCS parameter indicating a transmit format combination of the DL_DPCH and a TFCI Signaling Mode parameter representing a TFCI signaling mode. These parameters are previously defined in the 3GPP standard. As HS-DPCCH information according to the present invention, an HS-DPCCH power offset parameter, a power offset value that should be transmitted from the RNC A 402 to the Node B#1 405, is newly defined in Table 2. The Node B#1 405, if it has information on the power offset value, can determine a decision threshold line for determining the ACK/NACK as illustrated in FIG. 8C. Although Table 2 illustrates only the parameters necessary for description of the present invention, additional parameters can be included in the Radio Link Reconfiguration Request message.

Next, a detailed description of a second method will be made herein below.

It will be assumed in FIG. 4 that the RNC A 402 is an SRNC of the UE 419. A frame protocol used in the second method, as an official procedure for defining a control frame structure, supports frame transmission. The second method using the frame protocol includes a method for transmitting by the RNC A 402 a control frame to the Node B#1 405 managing an HSDPA service.

Figure 10:
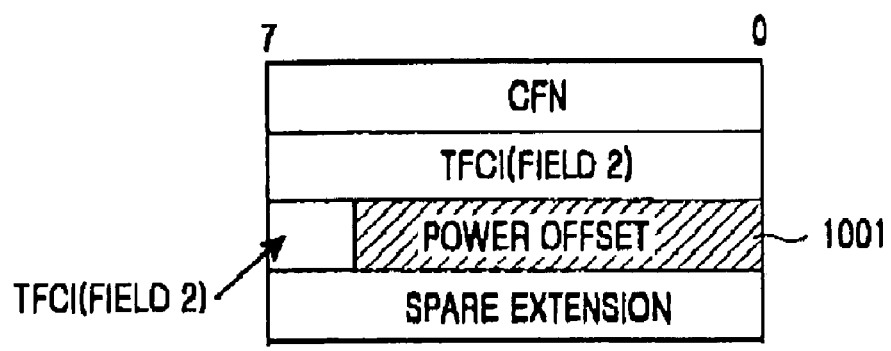
FIG. 10 illustrates an example of a control frame for transmitting a power offset value from an SNRC to a Node B using a frame protocol according to the first embodiment of the present invention.

FIG. 10 illustrates an example of a control frame for transmitting a power offset value from an SNRC to a Node B using a frame protocol. As illustrated in FIG. 10, a power offset value can be added to a spare field 1001 of a control frame before being transmitted. When the frame protocol is used, there is a method for transmitting an HS-DSCH data frame from the RNC A 402 to only the cell #1 407 that transmit the HS-DSCH.

Figure 11:
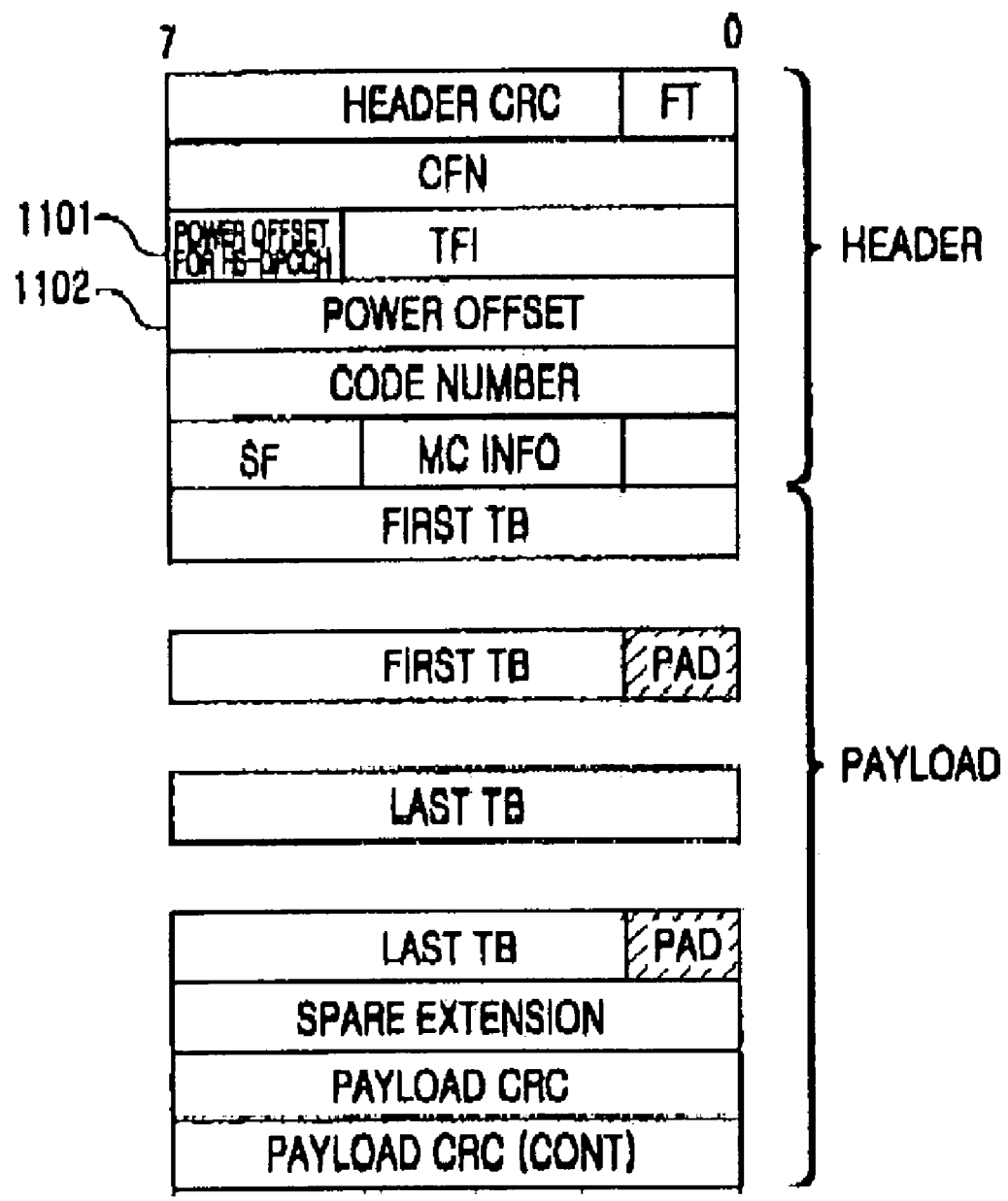
FIG. 11 illustrates an example of a data frame for transmitting a power offset from an SRNC to a Node B, using a frame protocol according to the first embodiment of the present invention.

FIG. 11 illustrates an example of a data frame for transmitting a power offset from an SRNC to a Node B, using a frame protocol. As illustrated in FIG. 11, a power offset value 1101 can be added to a spare field of a header constituting a data frame before being transmitted. However, an adjacent power offset 1102 is not a power offset for HS-DPCCH, but a data power offset. It is shown in FIG. 11 that a power offset value 1101 according to the present invention is added to spare bits arranged in line with TFI bits. Since the number of the spare bits is 3, the number of possible power offset values that can be transmitted from an SRNC to a Node B becomes 8.

3. Control of Transmission Power of an HS-DPCCH Based on a Power Offset

Figure 12:
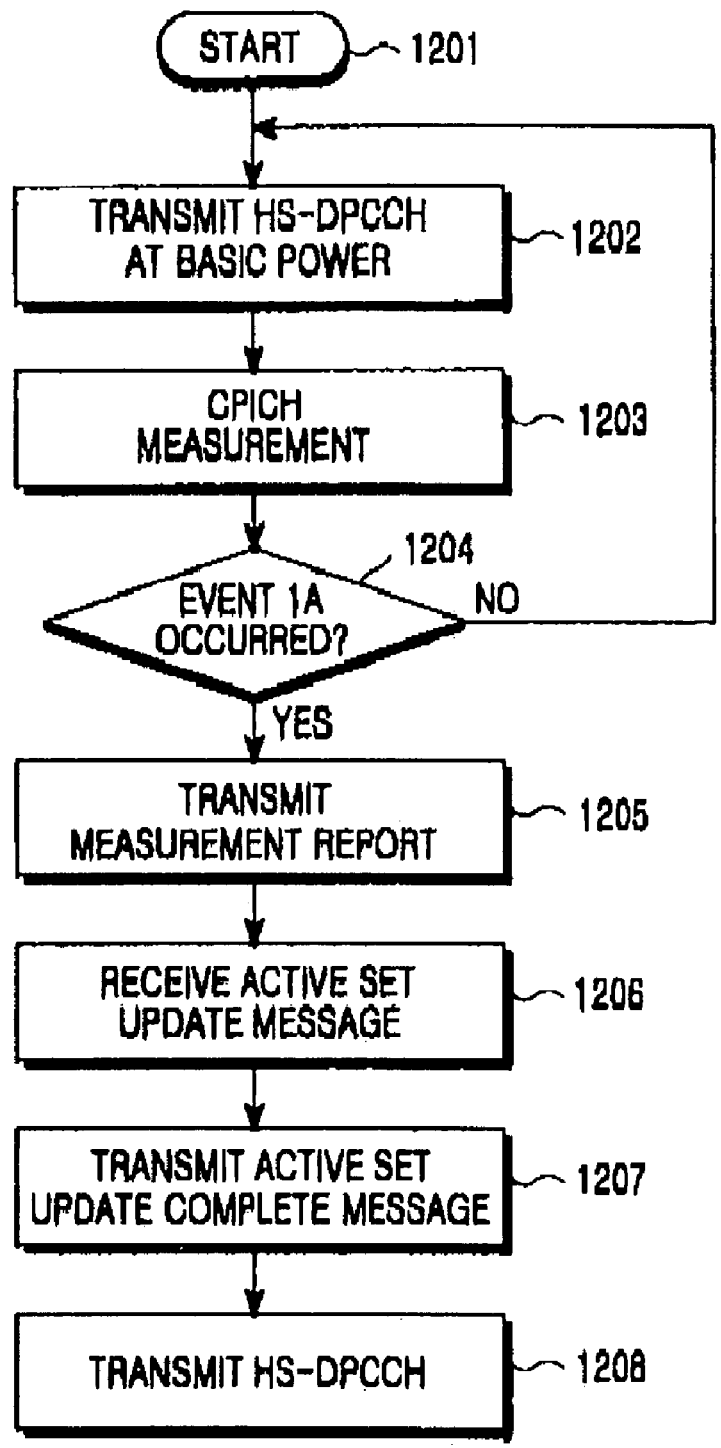
FIG. 12 illustrates a control flow performed by a UE according to the first embodiment of the present invention.

FIG. 12 illustrates a control flow of the UE 419 according to the first embodiment of the present invention. Beginning at step 1201, a UE transmits an HS-DPCCH at transmission power basically set as described in conjunction with FIGS. 5B or 5C in step 1202. In step 1203, the UE measures reception power of CPICHs received from several Node Bs. If reception power for the cell #1 407 is higher by a predetermined value than transmission power for the cell #2 408, event 1A occurs. If it is determined in step 1204 that the even 1A has occurred, the UE transmits a measurement report to an SRNC (or reports the measurement result to an SRNC) in step 1205, determining that the cell #2 408 must be included in an active set. However, if it is determined that the event 1A has not occurred in step 1204, the UE returns to step 1202 and transmits HS-DPCCH at basic power. After transmitting a measurement report to the SRNC in step 1205, the UE proceeds to step 1206 if a UTRAN has completed setting for active set updating.

Upon receiving the measurement report, the SRNC transmits an Active Set Update message with a power offset value for HS-DPCCH to the UE. The Active Set Update message includes the parameters illustrated in Table 1. The UE receives the Active Set Update message in step 1206 and analyzes the power offset value included in the Active Set Update message. The UE determines transmission power to be applied to HS-DPCCH based on the power offset value and transmits the HS-DPCCH at the determined transmission power. In 1207, the UE transmits an Active Set Update Complete message to the SRNC, and transmits the HS-DPCCH in step 1208, completing the entire operation.

Figure 13:
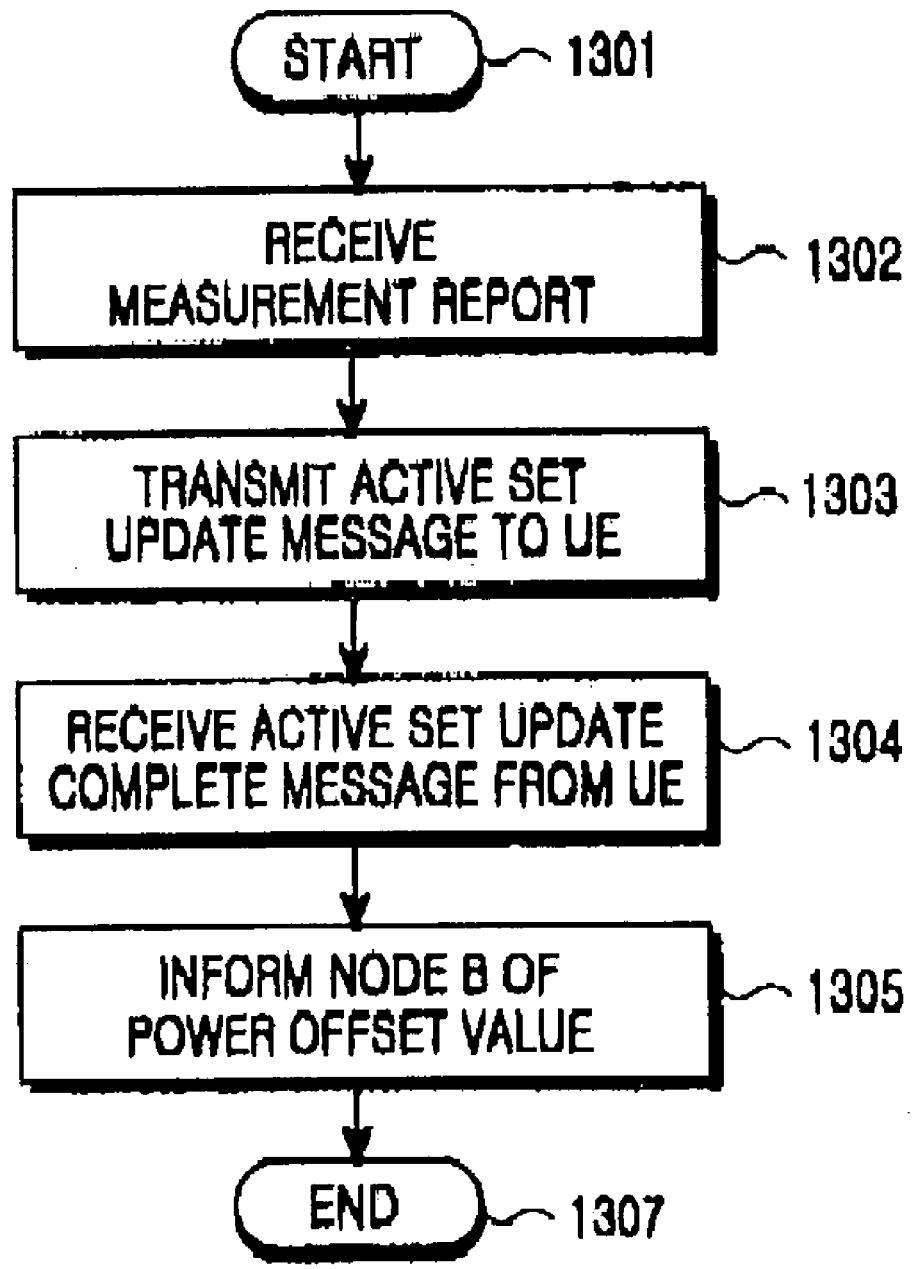
FIG. 13 illustrates a control flow performed by an SRNC according to the first embodiment of the present invention.

FIG. 13 illustrates a control flow of an SRNC according to the first embodiment of the present invention. Beginning at step 1301, an SRNC receives a measurement report from a UE in step 1302. The SRNC transmits to the UE an Active Set Update message with a power offset value for an HS-DPCCH, illustrated in Table 1, in step 1303.

Thereafter, in step 1304, the SRNC receives from the UE an Active Set Update Complete message representing that the Active Set Update message has been normally handled. As described in conjunction with FIG. 8, in order to determine ACK/NACK information of an HS-DPCCH, a Node B must have information on the power offset value, so the SRNC transmits the power offset value to the Node B in step 1305.

The present invention proposes two methods for transmitting the power offset value from an SRNC to a Node B. In a first method, as described in conjunction with FIG. 9, an SRNC transmits to a Node B a Radio Link Reconfiguration Request message with a power offset value for an HS-DPCCH, illustrated in Table 2, and receives a Radio Link Reconfiguration Response message from the Node B. In a second method, as described in conjunction with FIG. 10 or FIG. 11, an SRNC transmits to a Node B an HS-DSCH control frame or data frame with a power offset value for an HS-DPCCH. After informing the Node B of the power offset value in this way, the SRNC ends its operation in step 1307.

Figure 14:
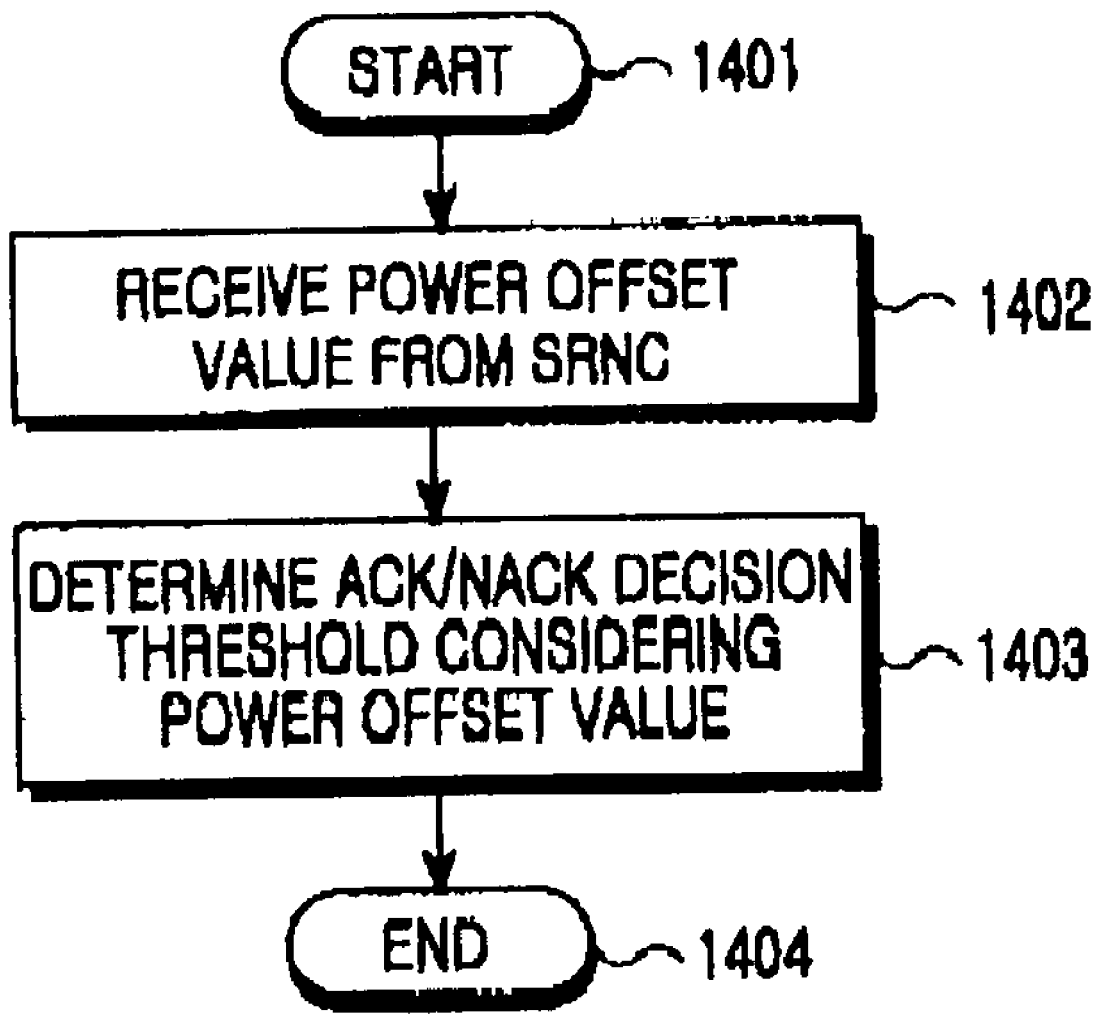
FIG. 14 illustrates a control flow performed by a Node B according to the first embodiment of the present invention.

FIG. 14 illustrates a control flow of a Node B according to a first embodiment of the present invention. Beginning at step 1401, a Node B receives a power offset value from an SRNC in step 1402. The power offset value can be received through a Radio Link Reconfiguration Request message, or through a control or data frame of an HS-DSCH. In step 1403, the Node B determines a decision threshold line for determining an ACK/NACK depending on the received power offset value, and then ends the entire operation in step 1404.

Figure 15:
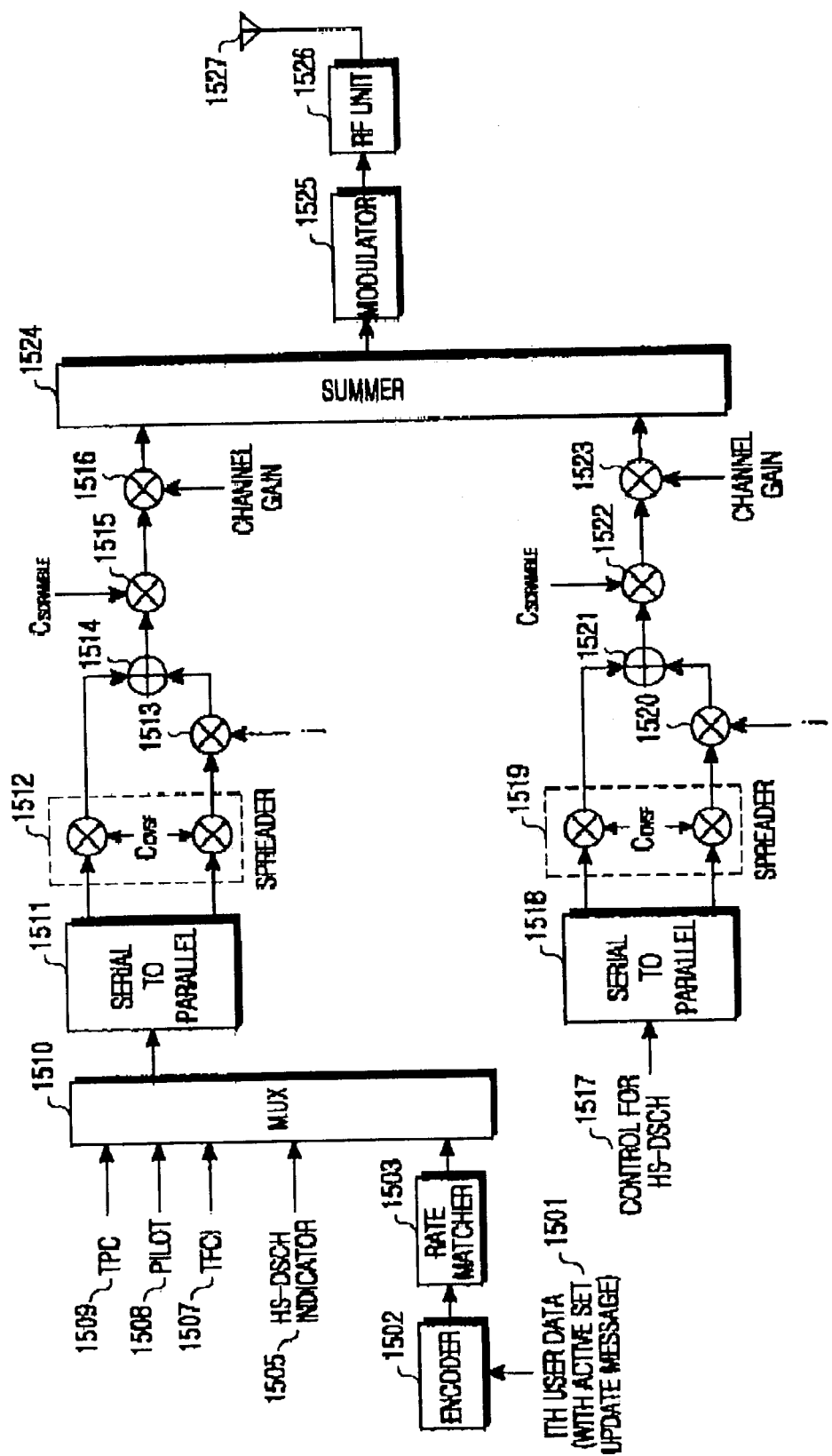
FIG. 15 illustrates a structure of a Node B transmitter according to the first embodiment of the present invention.

FIG. 15 illustrates an example of a Node B transmitter for transmitting to a UE a power offset value through upper layer signaling according to the first embodiment of the present invention. Specifically, FIG. 15 illustrates a Node B transmitter for the case where the Active Set Update message described in conjunction with FIG. 7 is transmitted over a DL_DPCH. User data 1501 with an Active Set Update message is channel-encoded by an encoder 1502 and then rate-matched to the number of bits to be transmitted over a physical channel by a rate matcher 1503. An output of the rate matcher 1503 is provided to a multiplexer (MUX) 1510 along with an HS-DSCH indicator 1505, a TFCI 1507, a Pilot 1508, and a TPC 1509, and generated into one bit stream. The bit stream is converted into two bit streams by a serial-to-parallel converter 1511. A spreader 1512 spreads the two bit streams with the same channelization code thus to secure orthogonality with signals using other channelization codes. Of two bit streams output from the spreader 1512, a Q signal is multiplied by j by a multiplier 1513, and then added to an I signal, the remaining bit stream, by an adder 1514, generating one complex stream. The complex stream is multiplied by a complex scrambling code $C_{scramble}$ by the chip by a scrambler 1515 so that it can be distinguished from signals using other scrambling codes. An output of the scrambler 1515 is multiplied by a channel gain by a multiplier 1516. The channel gain, a parameter for determining transmission power of DL_DPCH, generally has a large value for a low spreading factor. The channel gain depends upon the type of user data.

Further, FIG. 15 provides an SHCCH transmitter. Control information 1517 for an HS-DSCH is converted into two bit streams by a serial-to-parallel converter 1518, and then spread by a spreader 1519. Of two bit streams output from the spreader 1519, a Q signal is multiplied by j by a multiplier 1520, and then added to an I signal, the remaining bit stream, by an adder 1521, generating one complex stream. The complex stream is multiplied by a complex scrambling code $C_{scramble}$ by the chip by a scrambler 1522. An output of the scrambler 1522 is multiplied by a channel gain by a multiplier 1523.

A DL_DPCH from the multiplier 1516 and an SHCCH from the multiplier 1523 are summed up by a summer 1524, and then modulated by a modulator 1525. The modulated signal is converted into a radio frequency (RF) band signal by an RF unit 1526, and then transmitted through an antenna 1527.

Figure 16:
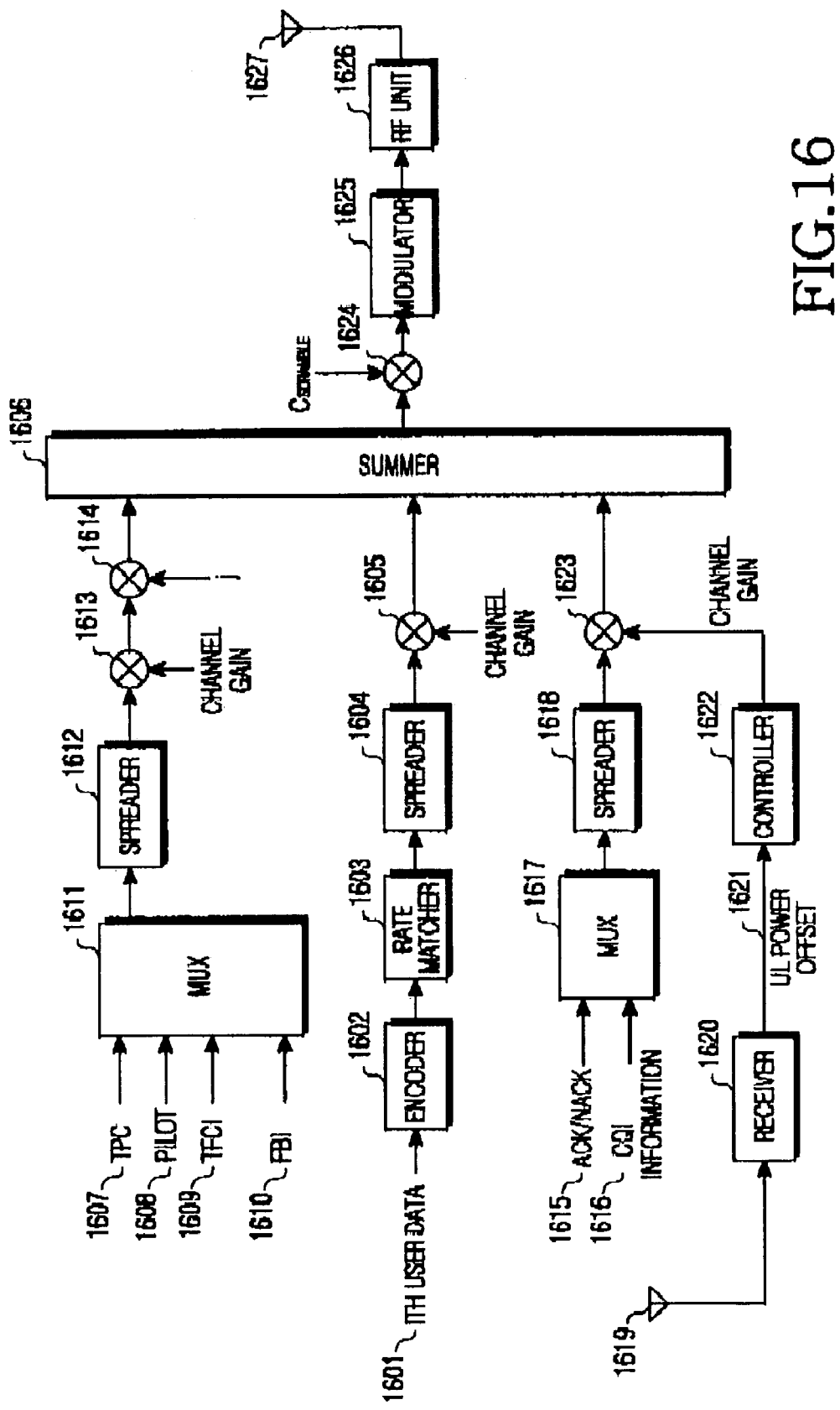
FIG. 16 illustrates a structure of a UE transceiver according to the first embodiment of the present invention.

FIG. 16 illustrates a structure of a UE transceiver corresponding to the Node B transmitter illustrated in FIG. 15, wherein the UE transceiver controls transmission power for an HS-DPCCH by receiving a power offset value from a Node B and then transmits the power-controlled HS-DPCCH along with other uplink channels. Referring to FIG. 16, user data 1601 is channel-encoded with a convolutional code or a turbo code by an encoder 1602, and then provided to a rate matcher 1603. The rate matcher 1603 performs symbol puncturing or symbol repetition and interleaving on the coded bit stream, generating rate-matched data having a proper format to be transmitted over a UL_D-PDCH. The data generated by the rate matcher 1603 is spread with a channelization code for a UL_DPDCH by a spreader 1604. The user data spread by the spreader 1604 is multiplied by a channel gain by a multiplier 1605. A UL_DPDCH signal multiplied by the channel gain is provided to a summer 1606.

A TPC 1607, a Pilot 1608, a TFCI 1609, and an FBI 1610 are multiplexed into one bit stream by a multiplexer 1611. The one bit stream is spread with a channelization code for a DPCCH by a spreader 1612, and then multiplied by a channel gain for the DPCCH by a multiplier 1613. An output of the multiplier 1613 is multiplied by a complex number j by a multiplier 1614. The reason for multiplying the output of the multiplier 1613 by the complex number j is to reduce frequency of occurrences of zero crossing in a constellation diagram on a radio frequency by separating a UL_DPCCH and a UL_DPDCH into a real part and an imaginary part. If frequency of occurrences of zero crossing is reduced, a UE transmitter can decrease a peak-to-average ratio (PAR). It is commonly known in the art, that in a constellation diagram on a radio frequency, occurrence of zero crossing increases PAR, and the increase in PAR exerts a bad effect on a UE transmitter. A UL_DPCCH signal having an imaginary value by the multiplier 1614 is provided to the summer 1606, and summed up with the UL_DPDCH signal. The UL_DPCCH signal and the UL_DPDCH signal, though they are summed up, maintain their properties, since the summation is performed between an imaginary number and a real number.

ACK/NACK 1615 and CQI information 1616, transmission start points of which are separated by a multiplexer 1617, are spread with a spreading code for an HS-DPCCH by a spreader 1618. At the same time, the UE extracts a power offset value 1621 using a receiver unit 1620 for processing data received through a reception antenna 1619. A controller 1621 then controls a channel gain to increase existing transmission power of an HS-DPCCH, which has been maintaining a predetermined power ratio to the UL_DPCCH, by the power offset value. A multiplier 1623 multiplies the channel gain by an HS-DPCCH signal from the spreader 1618. That is, the UE applies a channel gain for the UL_DPDCH and the UL_DPCCH in the existing manner, and controls only a channel gain for the HS-DPCCH using the power offset value. The HS-DPCCH signal multiplied by the channel gain by the multiplier 1623 is provided to the summer 1606, and summed up with the UL_DPDCH signal and UL_DPCCH signal.

As described above, the UL_DPCCH, since it has an imaginary value obtained by multiplying it by a complex number j, maintains its unique characteristic, although it is summed up with an HS-DPCCH. The UL_DPDCH and the HS-DPCCH, since they are spread with different channelization codes, do not interfere with each other when they are despread at a receiver. Unlike the UL-DPCCH, the reason for mixing the HS-DPCCH with the UL_DPDCH and transmitting it through an I channel and transmitting the UL_DPCCH through a Q channel is because the HS-DPCCH is not transmitted when there is no user information or upper layer signaling on the UL_DPDCH transmitted over a real channel (I channel). When the UL_DPDCH is not transmitted, if two DPCCHs are both transmitted over an imaginary channel (Q channel), frequency of occurrences of zero crossing is increased. Since the increase in frequency of occurrences of zero crossing may increase PAR of a UE transmitter, the HS-DPCCH is transmitted over the real channel, contributing to minimization in PAR of the UE transmitter. The UL_DPDCH, UL_DPCCH, and HS-DPCCH summed by the summer 1606 are multiplied in the form of I+J by a complex uplink scrambling code used in the UE by a multiplier 1624, for scrambling, and then modulated by a modulator 1625. The modulated signal is converted into an RF signal by an RF unit 1626, and then transmitted to a Node B through an antenna 1627. The uplink scrambling code used by the multiplier 1624 is a code used to identify UEs in UMTS, and is generated from a Gold code. The uplink scrambling code used by the multiplier 1624 is used again by the Node B to descramble a signal transmitted by the UE.

In the first embodiment where a power offset value of an HS-DPCCH is transmitted through upper layer signaling only when a UE is located in a handover region, it is difficult to flexibly control transmission power of the HS-DPCCH. In a second embodiment, proposed to make up for this disadvantage, a Node B flexibly transmits a power offset value determined according to reception power, while measuring the reception power of the HS-DPCCH received.

Embodiment #2

A method for transmitting a power offset value through a MAC-hs PDU for an HSDPA service will now be described as a second embodiment of the present invention.

Figure 17:
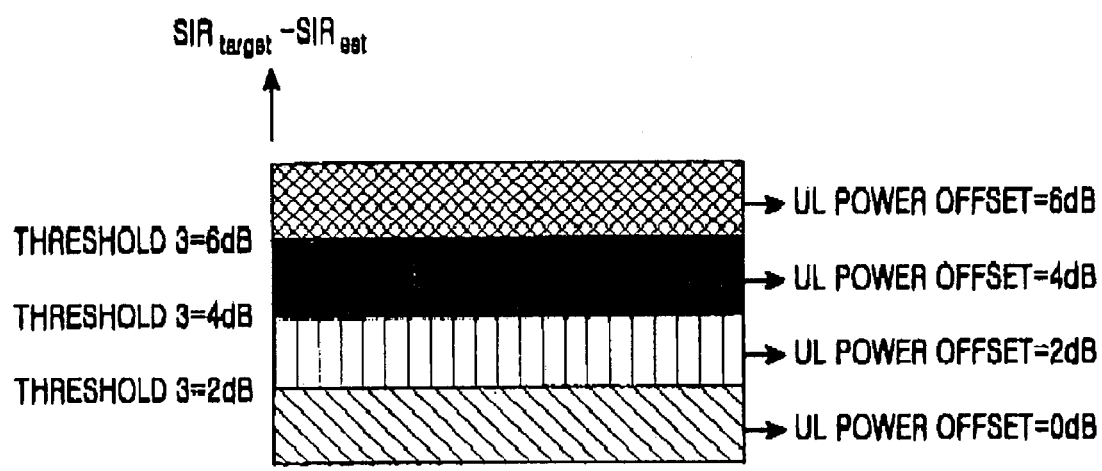
FIG. 17 illustrates a general concept for performing power control at an upper layer according to a second embodiment of the present invention.

With reference to FIG. 17 and Table 3, a description will be made of a method for determining a power offset value by a Node B according to the second embodiment of the present invention and an example of bits for the power offset value. Commonly, when a UE is located in a handover region, a case occurs where transmission power of HS-DPCCH is decreased. In this case, however, it is difficult for a Node B to continuously monitor whether the UE is located in the handover region. Therefore, in the present invention, if a difference between a target SIR $SIR_{target}$ and an uplink SIR $SIR_{est}$ measured with pilot bits transmitted over a UL_DPCCH is greater than a threshold value, the Node B determines that a channel has a poor condition.

Since ACK/NACK information and CQI information of an HS-DPCCH may have different transmission power, a Node B will set different target SIRs for the ACK/NACK information and the CQI information. The ACK/NACK and CQI information will be DTX-processed, when they are unnecessary. That is, when receiving an ACK/NACK, the Node B will compare a target SIR for the ACK/NACK with a measured SIR for the ACK/NACK. Further, when receiving CQI information, the Node B will compare a target SIR for the CQI information with a measured SIR for the CQI information. For the sake of explanation, the present invention will be described on the assumption that a Node B has set the same target SIR for both ACK/NACK and CQI.

Thereafter, the Node B will determine a power offset value according to an uplink channel environment by comparing an SIR difference with threshold values. That is, the Node B will compensate uplink transmission power not only when a UE is in a soft handover state, but also when an uplink channel environment is poor.

FIG. 17 illustrates an example of determining a power offset value according to the second embodiment of the present invention by a Node B depending on a difference between a target SIR $SIR_{target}$ and an uplink measured SIR $SIR_{est}$ in power control at an upper layer. Although threshold values can be arbitrarily determined, it will be assumed herein that multiples of 2 dB are defined as threshold values. For example, for a threshold value 2 dB, if a difference between two SIR values is larger than or equal to 2 dB and smaller than or equal to 4 dB, an uplink power offset value is set to 2 dB and uplink transmission power of UE is increased by the power offset value of 2 dB. For the other threshold values of 4 dB, 6 dB, and 8 dB, the power offset value is applied in the same way. The present invention defines a difference between a target SIR and an SIR of a UL_DPCCH as an offset, increases transmission power of only the an HS-DPCCH by the offset, and applies the existing method to the other uplink channels of the UL_DPCCH and a UL_DPDCH. Transmission power of an HS-DPCCH is increased by the offset value, only when a channel condition is poor on the basis of power determined according to a ratio to existing transmission power of the UL DPCCH each time.

Table 3 illustrates an example of converting power offset values determined in conjunction with FIG. 17 into bits to be transmitted over a downlink. If the number of power offset values is 2 k, the number of downlink transmission bits can be set to k. In Table 3, since there are 4 offset values of 0 dB, 2 dB, 4 dB, and 6 dB, the offset values can be expressed with 2 bits, and transmission bits of the offset values can defined as 00, 01, 10 and 11, respectively.

TABLE 3

| HS-DPCCH power offset | Tx bits |
|---|---|
| 0 | 00 |
| 2 | 01 |
| 4 | 10 |
| 6 | 11 |

Figure 18:
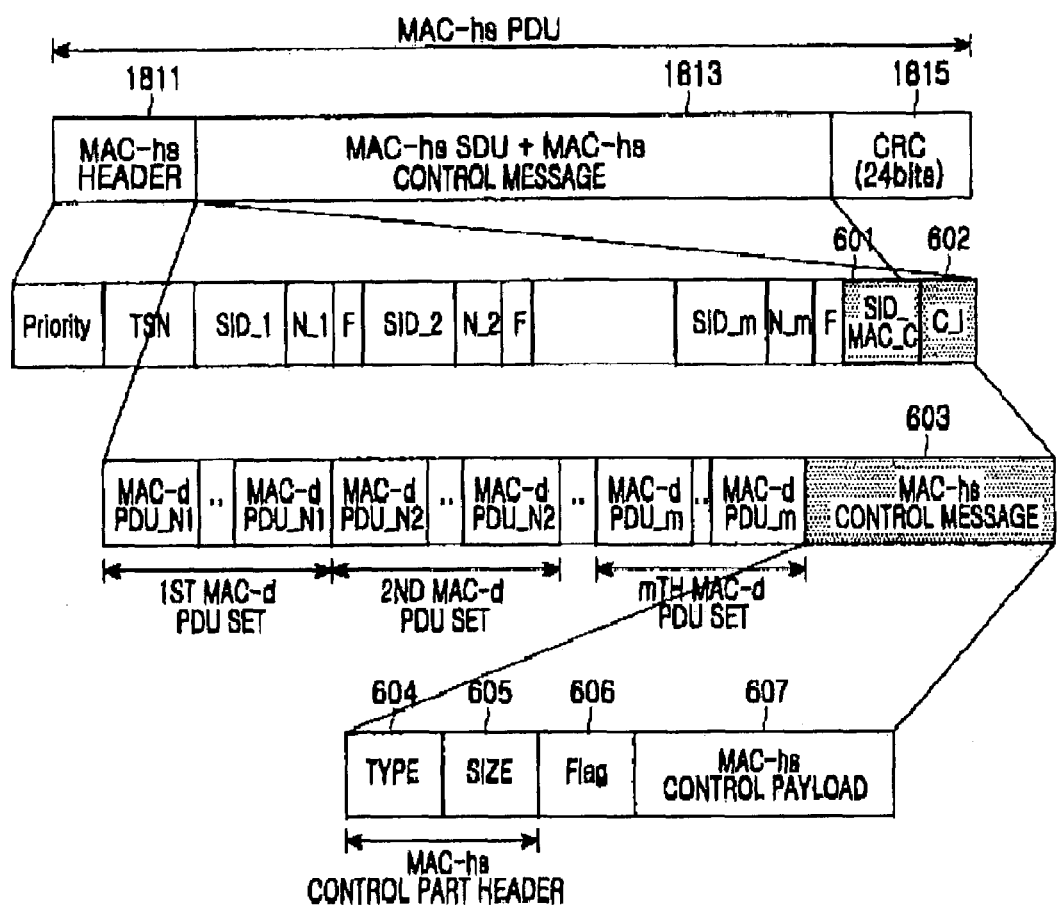
FIG. 18 illustrates a structure of a MAC-hs PDU according to the second embodiment of the present invention.

The second embodiment of the present invention provides a method for transmitting power offset bits of an HS-DPCCH, determined in a method described in conjunction with FIG. 17 and Table 3, to a UE along with a MAC-hs PDU, and a structure of the MAC-hs PDU will be described with reference to FIG. 18. FIG. 18 illustrates a structure of the MAC-hs PDU according to a second embodiment of the present invention.

Referring to FIG. 18, a MAC-hs PDU includes a MAC-hs header field 1811, a MAC-hs service data unit (SDU)+ MAC-hs control message field 1813, and a cyclic redundancy check (CRC) field 1815. The MAC-hs header field 1811 includes:

(1) Priority: this is a priority queue identifier of the MAC-hs SDU 1813, and 3 bits are assigned thereto.

(2) TSN (Transmission Sequence Number): this is a sequence number used when the MAC-hs SDU 1813 is reordered in a priority queue, and 5 or 6 bits are assigned thereto.

(3) SID_x: this represents a size of MAC-dedicated (MAC-d) PDUs belonging to an $x^{th}$ MAD-d PDU set among sets of the MAC-d PDUs constituting MAC-hs SDU 1813, and 2 or 3 bits are assigned thereto.

(4) N_x: this represents the number of the MAC-d PDUs belonging to an $x^{th}$ MAC-d PDU set, and 7 bits are assigned thereto.

(5) F (Flag): when F is set to 1, it means that the next field is a MAC-hs SDU field, and when F is set to 0, it means that the next field is an SID field. 1 bit is assigned thereto.

(6) SID_MAC_C 601: this is information having the same size as SID_x and having no meaning. Both a transmitter and a receiver disregard the SID_MAC_C value.

(7) C_I 602: this has the same size as the sum of sizes of N_x and Fs, and represents whether a MAC-hs control message exists in MAC-h PDU. In C_I, a part corresponding to N_x is always coded with the same value, using a value unused in N_x. If a value previously set in the last N_x part of the MAC-hs header is received, a receiver determines that a MAC-hs control message is included in MAC-hs PDU. In the present invention, the value set in the last N_x part is fixed to '0000000'. Therefore, C_I is always set to '00000001'.

(8) MAC-hs control message 603: this is located after MAC-hs SDU, and includes a MAC-hs control part header, a Flag 606, and a MAC-hs control payload 607. The MAC-hs control part header includes a Type field 604 and a Size field 605. The Type field 604 represents a type of the MAC-hs control message and has 3 bits. The Type field 604 has the following meanings illustrated in Table 4.

TABLE 4

| Type | Message type |
|---|---|
| 000 | HS-DPCCH power offset |
| 001 | Reserved |
| 010 | Reserved |
| 011 | Reserved |
| 100 | Reserved |
| 101 | Reserved |
| 110 | Reserved |
| 111 | Reserved |

The Size field 605 represents a size of the MAC-hs control message in terms of bit, and is assigned 13 bits. The Flag 606 represents whether there is a MAC-hs control message following a corresponding MAC-hs control message. The MAC-hs control payload 607 is a part constituting actual data of the MAC-hs control message.

Figure 19:
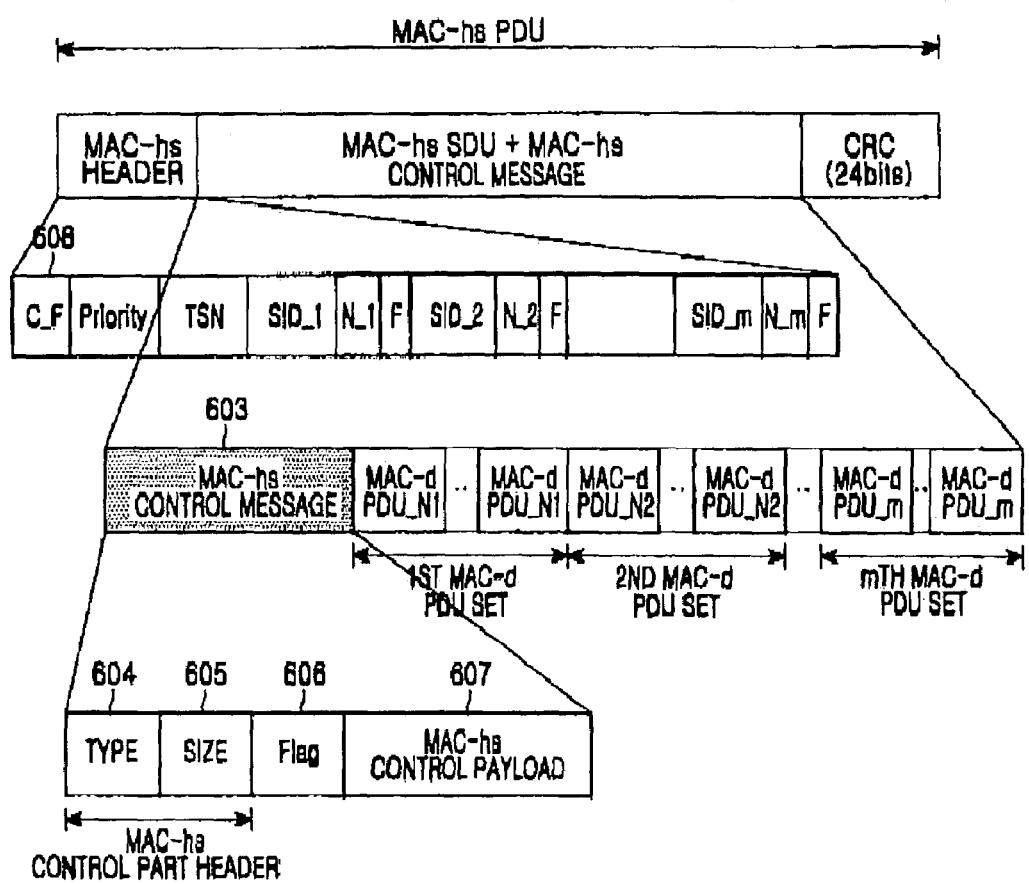
FIG. 19 illustrates another structure of a MAC-hs PDU according to the second embodiment of the present invention.

FIG. 19 illustrates another structure of a MAC-hs PDU according to the second embodiment of the present invention. In FIG. 19, a 1-bit C_F flag 608 can be used to represent whether a MAC-hs control message is in MAC-hs PDU, instead of using SID_MAC_C 601 and C_I 602 as illustrated in FIG. 18. The C_F flag 608 can be located at the head of MAC-hs PDU, right after a Priority field, or right after TSN. A MAC-hs control message indicated by the C_F flag 608 can be located at the head of MAC-hs SDU, or at the end of MAC-hs SDU as illustrated in FIG. 18.

Now, a structure of the MAC-hs control payload will be described.

The MAC-hs control payload is determined according to the type of the MAC-hs control message. For example, the MAC-hs control payload has a structure illustrated in FIG. 20, and a structure of the MAC-hs control payload will be described with reference to FIG. 20.

Figure 20:
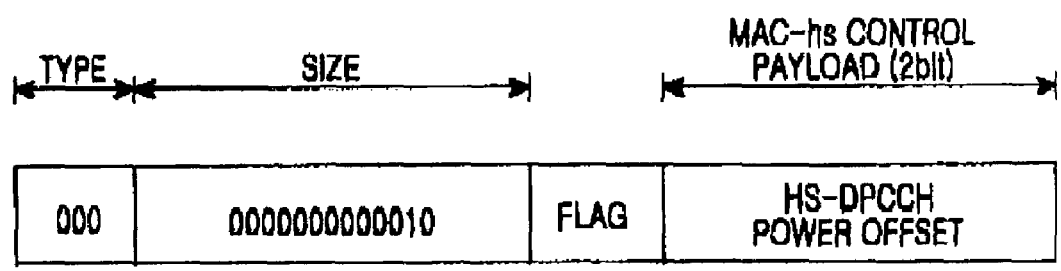
FIG. 20 illustrates a structure of a MAC-hs control payload according to the second embodiment of the present invention.

Referring to FIG. 20, a Type field is set to an HS-DPCCH power offset, and power offset bits for an HS-DPCCH, determined in the method of Table 3, will be transmitted over a payload of FIG. 20. A Size field of FIG. 20 is filled with '00000000000010' indicating a size of the MAC-hs control payload, and a Flag field is filled with a value determined according to whether there is a next MAC-hs control message. Further, the MAC-hs control payload part is filled with power offset bits for the HS-DPCCH.

Figure 21:
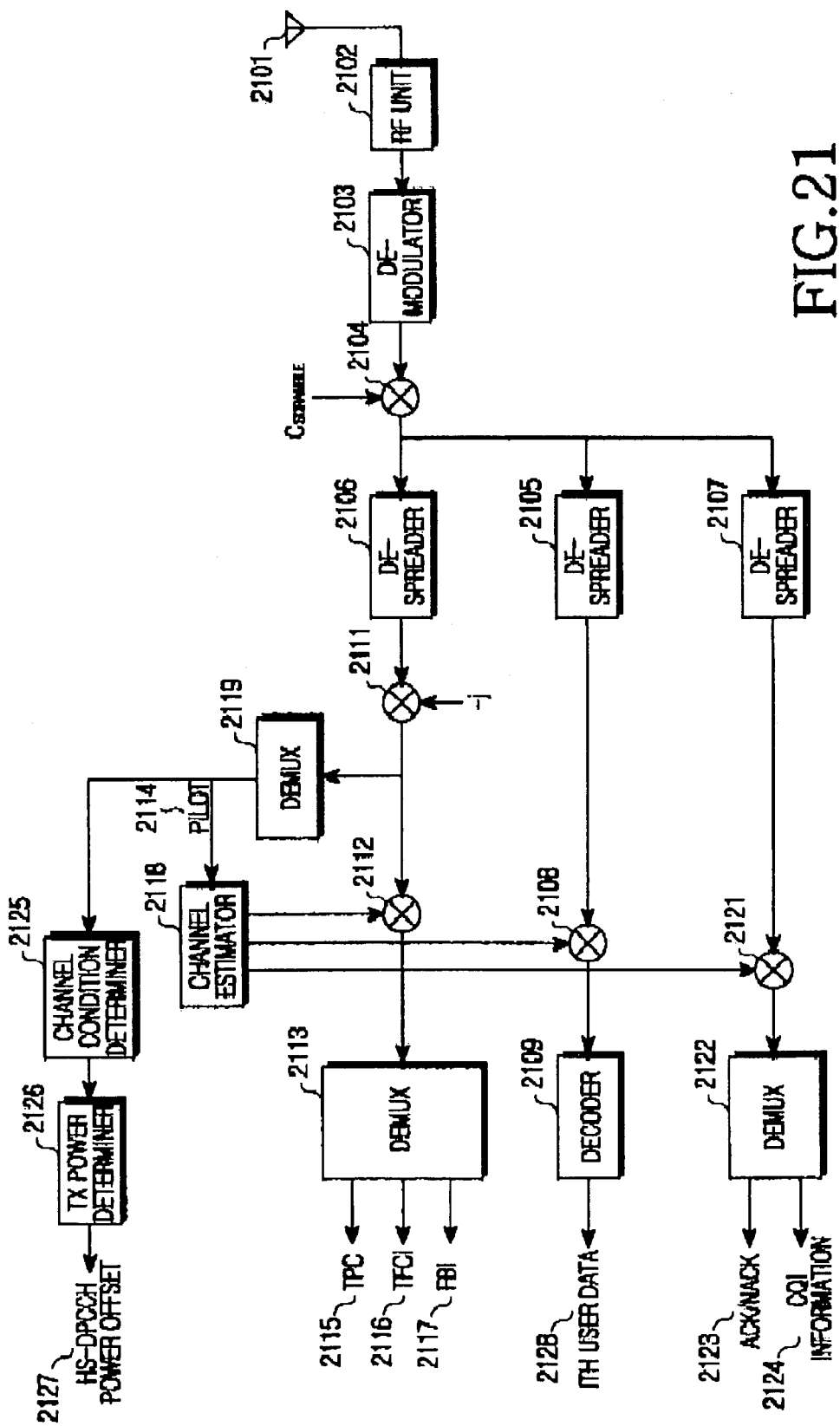
FIG. 21 illustrates structure of a Node B receiver according to the second embodiment of the present invention.

FIG. 21 illustrates a structure of a Node B receiver, wherein a Node B receives a UL_DPCH transmitted from a UE and determines an uplink power offset value from the received UL_DPCH in the manner described in conjunction with FIG. 17. Referring to FIG. 21, a RF signal received from a UE through an antenna 2101 is converted into a baseband signal by an RF unit 2102, demodulated by a demodulator 2103, and then multiplied by a scrambling code by a multiplier 2104, for descrambling.

An output signal of the multiplier 2104 is despread by despreaders 2105, 2106, and 2107. A channelization code used in the despreader 2105 is identical to the channelization code used in the spreader 1404 of FIG. 14, and a channelization code used in the despreader 2106 is identical to the channelization code used in the spreader 1412 of FIG. 14. Further, a channelization code used in the despreader 2107 is identical to the channelization code used in the spreader 1418 of FIG. 14. Since the channelization codes are orthogonal codes, signals despread by the despreaders 2105, 2106, and 2107 are separated into a UL_DPDCH, a UL_DPCCH and an HS-DPCCH. The despread UL_DPCCH output from the despreader 2106 is multiplied by −j by a multiplier 2111 to be restored to a real signal. The real UL_DPCCH signal is provided to a demultiplexer 2119 and a multiplier 2112.

The demultiplexer 2119 extracts only a pilot signal 2114 for uplink channel estimation from signal received over the UL_DPCCH, and provides the pilot signal 2114 to a channel estimator 2118 and a channel condition determiner 2125. The channel condition determiner 2125 calculates a difference between an SIR measured from the pilot signal 2114 and a target SIR, and determines whether the difference is larger than a threshold value. A transmission power determiner 2126 then determines an uplink power offset value 2127 by comparing the SIR difference with threshold values in the manner described in conjunction with FIG. 17 and Table 3.

The pilot signal 2114 applied to the channel estimator 2118 is used as data for estimating a channel environment from a UE to a Node B, and a compensation value for the estimated channel environment is calculated by the channel estimator 2118 and provided to multipliers 2112, 2108, and 2121. The UL_DPCCH is multiplied by a multiplier 2112 by a channel estimation value, a compensation value for the channel environment calculated by the channel estimator 2118, and then provided to a demultiplexer 2113. The demultiplexer 2113 demultiplexes signals received over the UL_DPCCH, except for the pilot signal 2114, into a TPC 2115, a TFCI 2116, and an FBI 2117. The TPC 2115 is used for control over uplink transmission power, the TFCI 2116 is used for analysis of UL_DPDCH, and the FBI is used for gain control over a closed-loop transmission antenna. The output signal of the multiplier 2104 is despread by the despreader 2105, thus being restored to a UL_DPDCH signal. The despreader 2105 eliminates other signals except the UL_DPDCH. The restored UL_DPDCH signal is multiplied by the channel estimation value by the multiplier 2108, and decoded by a decoder 2109 with a channelization code of, for example, a convolutional code or a turbo code, to be restored to user data or an upper layer signaling signal 2128. The restored user data or upper layer signaling signal 2128 is delivered to an upper layer. The output signal of the multiplier 2104 is despread by the despreader 2107 to be restored to an HS-DPCCH signal. The despreader 2107 eliminates other signals except the HS-DPCCH. The restored HS-DPCCH is multiplied by the channel estimation value output from the channel estimator 2118 by the multiplier 2121, for channel compensation, and then demultiplexed into ACK/NACK 2123 and CQI information 2124 by a demultiplexer 2122. When an ACK/NACK is received, the ACK/NACK 2123 is used, and when other control information is received, the CQI information 2124 is used.

Figure 22:
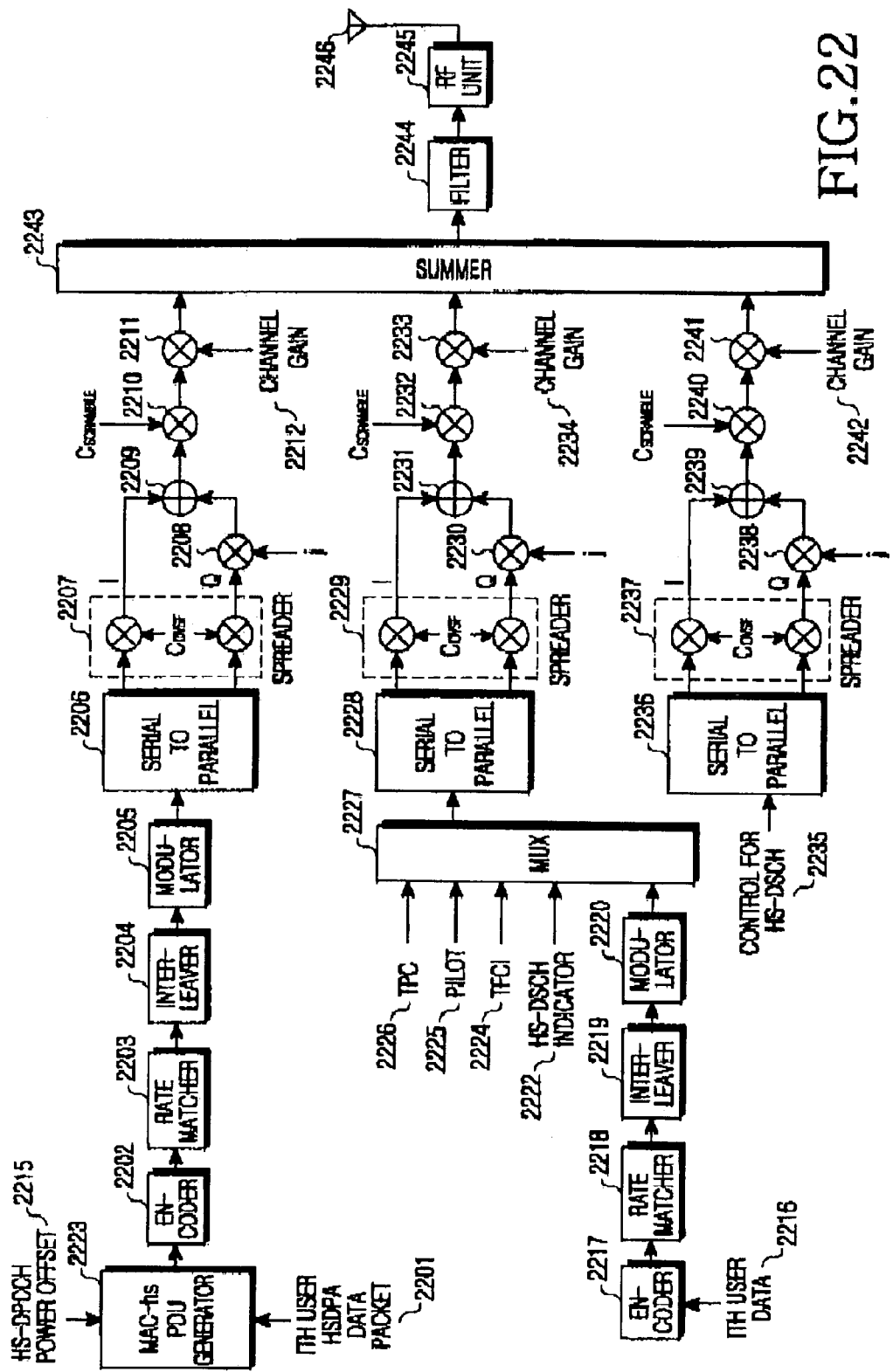
FIG. 22 illustrates a structure of a Node B transmitter according to the second embodiment of the present invention.

FIG. 22 illustrates a structure of a Node B transmitter when power offset bits for HS-DPCCH are transmitted over a MAC-hs PDU, i.e., an HS-DSCH, according to the second embodiment of the present invention. HS-DPCCH power offset bits 2215 obtained by converting a power offset value determined in FIG. 21 in accordance with Table 3 are applied to a MAC-hs PDU generator 2223 along with high-speed downlink packet data 2201 on an HS-DSCH.

The MAC-hs PDU generator 2223 generates a MAC-hs PDU having the structure illustrated in FIG. 18, using the high-speed packet data 2201 and the power offset value 2215. Here, a MAC-hs control payload transmits offset bits over the payload, using the structure illustrated in FIG. 19.

An output of the MAC-hs PDU generator 2223 is encoded by an encoder 2202, generating coded symbols. The coded symbols are applied to a rate matcher 2203, and the rate matcher 2203 performs symbol repetition and puncturing on the coded symbols, for rate matching, and outputs as many symbols as the number of symbols that can be transmitted for TTI. The rate-matched symbols are provided to an interleaver 2204, and the interleaver 2204 interleaves the rate-matched symbols and provides its output to a modulator 2205. The modulator 2205 modulates the interleaved symbols into QPSK (Quadrature Phase Shift Keying), 8 PSK (8-ary Phase Shift Keying), or M-ary QAM (Quadrature Amplitude Modulation) signals, and generates a bit stream. The bit stream is converted into two bit streams by a serial-to-parallel converter 2206, and a spreader 2207 spreads the two bit streams with the same channelization code to secure orthogonality with signals using other channelization codes. The two bit stream signals I and Q from the spreader 2207 are generated into one complex stream by a multiplier 2208 and an adder 2209. The complex stream output is multiplied by a complex scrambling code by the chip by a scrambler 2210 so that it can be distinguished from signals using other scrambling codes. An output of the scrambler 2210 is multiplied again by a channel gain 2212 by a multiplier 2211. The channel gain 2212, a parameter for determining transmission power of an HS-DSCH, has a large value for a low spreading factor and has a different value according to the type of user data.

User data 2216 to be transmitted over a DL_DPCH is channel-encoded by an encoder 2217, and then rate-matched by a rate matcher 2218 into as many bits as the number of bits to be transmitted over a physical channel. The rate-matched data is interleaved by an interleaver 2219, and then modulated by a modulator 2220. An output of the modulator 2220 is applied to a multiplexer 2227 along with an HS-DSCH indicator 2222, a TFCI 2224, a Pilot 2225 and a TPC 2226, and generated into one bit stream. The bit stream is converted into two bit streams by a serial-to-parallel converter 2228, and a spreader 2229 spreads the two bit streams with the same channelization code to secure orthogonality with signals using other channelization codes. The two bit stream signals I and Q from the spreader 2229 are generated into one complex stream by a multiplier 2230 and an adder 2231. The complex stream output is multiplied by a complex scrambling code by the chip by a scrambler 2232 so that it can be distinguished from signals using other scrambling codes. An output of the scrambler 2232 is multiplied again by a channel gain 2234 by a multiplier 2233.

Further, FIG. 22 provides an SHCCH transmitter. The HS-DSCH control information 2235 is converted into two bit streams by a serial-to-parallel converter 2236, and then spread by a spreader 2237. The two spread bit streams from the spreader 2237 are converted into one complex stream by a multiplier 2238 and an adder 2239. A complex output of the adder 2239 is multiplied by a complex scrambling code by the chip by a scrambler 2240, and then multiplied again by a cannel gain 2242 by a multiplier 2241. A HS-DSCH signal output from the multiplier 2211, a DL_DPCH signal output from the multiplier 2233, and an SHCCH signal output from the multiplier 2241 are summed up by a summer 2243, and then filtered by a filter 2244. The filtered signal is converted into an RF band signal by an RF unit 2245, and then transmitted through an antenna 2246.

Figure 23:
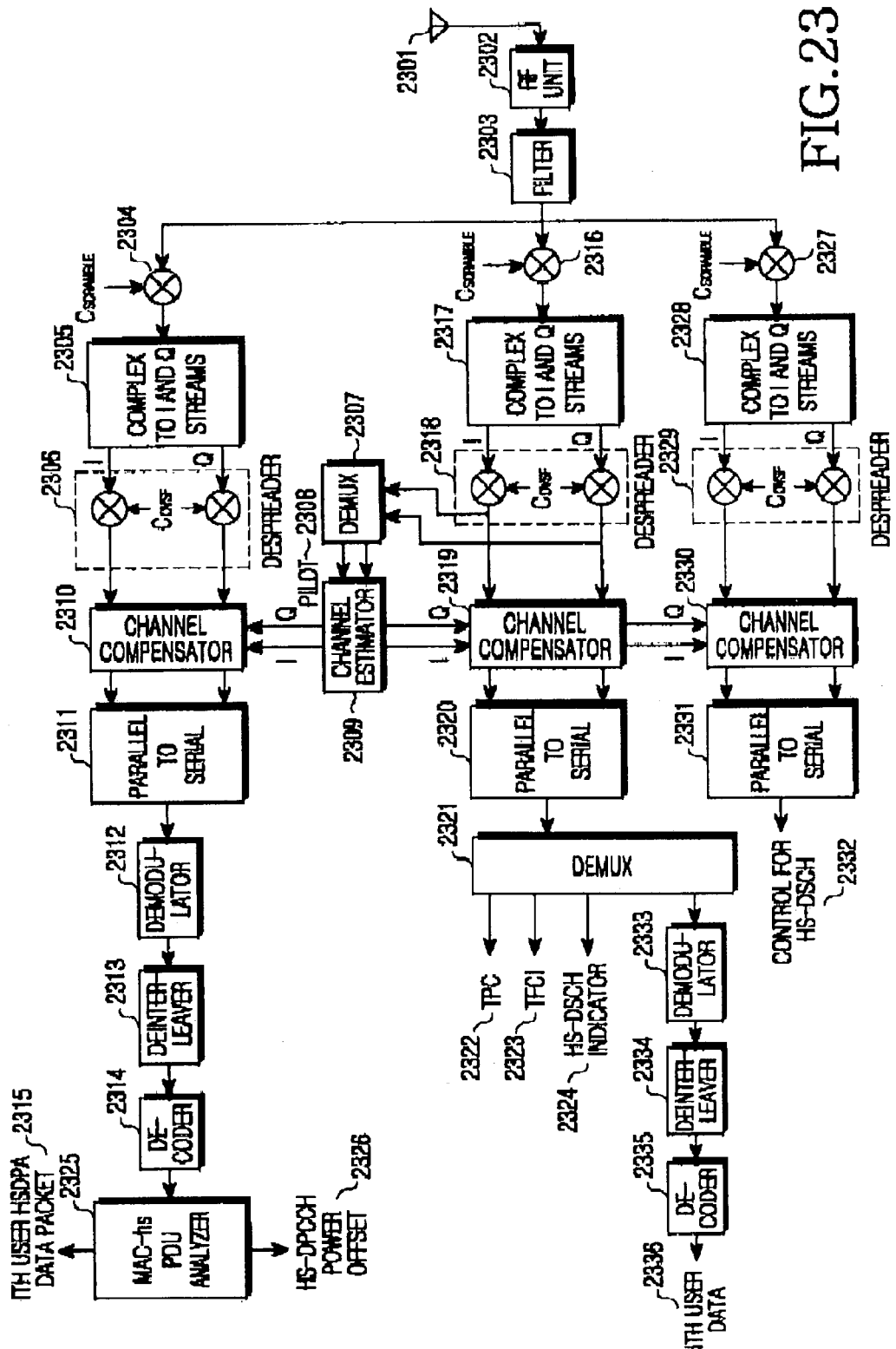
FIG. 23 illustrates a structure of a UE receiver according to the second embodiment of the present invention.

FIG. 23 illustrates an example of a UE receiver corresponding to the Node B transmitter illustrated in FIG. 22, according to the second embodiment of the present invention. Referring to FIG. 23, an RF band signal received through an antenna 2301 is converted into a baseband signal by an RF unit 2302, and then filtered by a filter 2303. The filtered signal output from the filter 2303 is applied commonly to descramblers 2304, 2316, and 2327. The descrambler 2304 outputs an HS-DSCH signal, the descrambler 2316 generates a DL_DPCH signal, and the descrambler 2327 outputs an HSCCH signal. A complex output of the descrambler 2304 is separated into an I signal or a real signal and a Q signal or an imaginary signal by a channel separator 2305, and the I signal and the Q signal are multiplied by a channelization code by a despreader 2306, for despreading. A complex output of the descrambler 2316 is separated into an I signal or a real signal and a Q signal or an imaginary signal by a channel separator 2317, and the I signal and the Q signal are multiplied by a channelization code by a despreader 2318, for despreading. Also, a complex output of the descrambler 2327 is separated into an I signal or a real signal and a Q signal or an imaginary signal by a channel separator 2328, and the I signal and the Q signal are multiplied by a channelization code by a despreader 2329, for despreading.

The I signal and Q signal despread by the despreader 2318 are applied to a demultiplexer 2307, and the demultiplexer 2307 generates a pilot signal 2308. The pilot signal 2308 is applied to a channel estimator 2309, and the channel estimator 2309 generates a channel estimation value through distortion estimation due to a radio channel, and applies the channel estimation value to channel compensators 2310, 2319, and 2330. The channel compensators 2310, 2319 and 2330 compensate for distortion due to a radio channel, using the channel estimation value. The channel compensator 2310 outputs two bit streams for HS-DSCH data, the channel compensator 2319 outputs two bit streams for DL_DPCH data, and the channel compensator 2330 outputs two bit streams for SHCCH data. A parallel-to-serial converter 2311 converts the two bit streams for HS-DSCH data into one bit stream. A parallel-to-serial converter 2331 converts the two bit streams for SHCCH data into one bit stream, finally generating control information 2332 for the HS-DSCH. A parallel-to-serial converter 2320 converts the two bit streams for DL_DPCH data into one bit stream. The output bit stream of the parallel-to-serial converter 2320 is demultiplexed into a TPC 2322, an TFCI 2323, and an HS-DSCH indicator 2324 by a demultiplexer 2321. Further, the demultiplexer 2321 outputs a downlink data signal through demultiplexing, and the downlink data signal is channel-decoded by a demodulator 2333, a deinterleaver 2334, and a decoder 2335, generating user data 2336.

The parallel-to-serial converter 2311 outputs a data signal received over the HS-DSCH, and the data signal is channel-decoded by a demodulator 2312, a deinterleaver 2313, and a decoder 2314, and then applied to a MAC-hs PDU analyzer 2325. The MAC-hs PDU analyzer 2325 performs a reverse operation of the MAC-hs PDU generator 2223 described in conjunction with FIG. 22. That is, the MAC-hs PDU analyzer 2325 becomes a device for extracting high-speed packet data 2315 and an HS-DPCCH power offset value 2326 from the output data of the decoder 2314. The power offset value 2326 is information extracted from the MAC-hs control payload described in conjunction with FIG. 19. A UE can transmit HS-DPCCH by applying the extracted power offset value to the structure described in conjunction with FIG. 19. That is, the controller 1622 illustrated in FIG. 16 controls a channel gain depending on the power offset value 2326.

Figure 24:
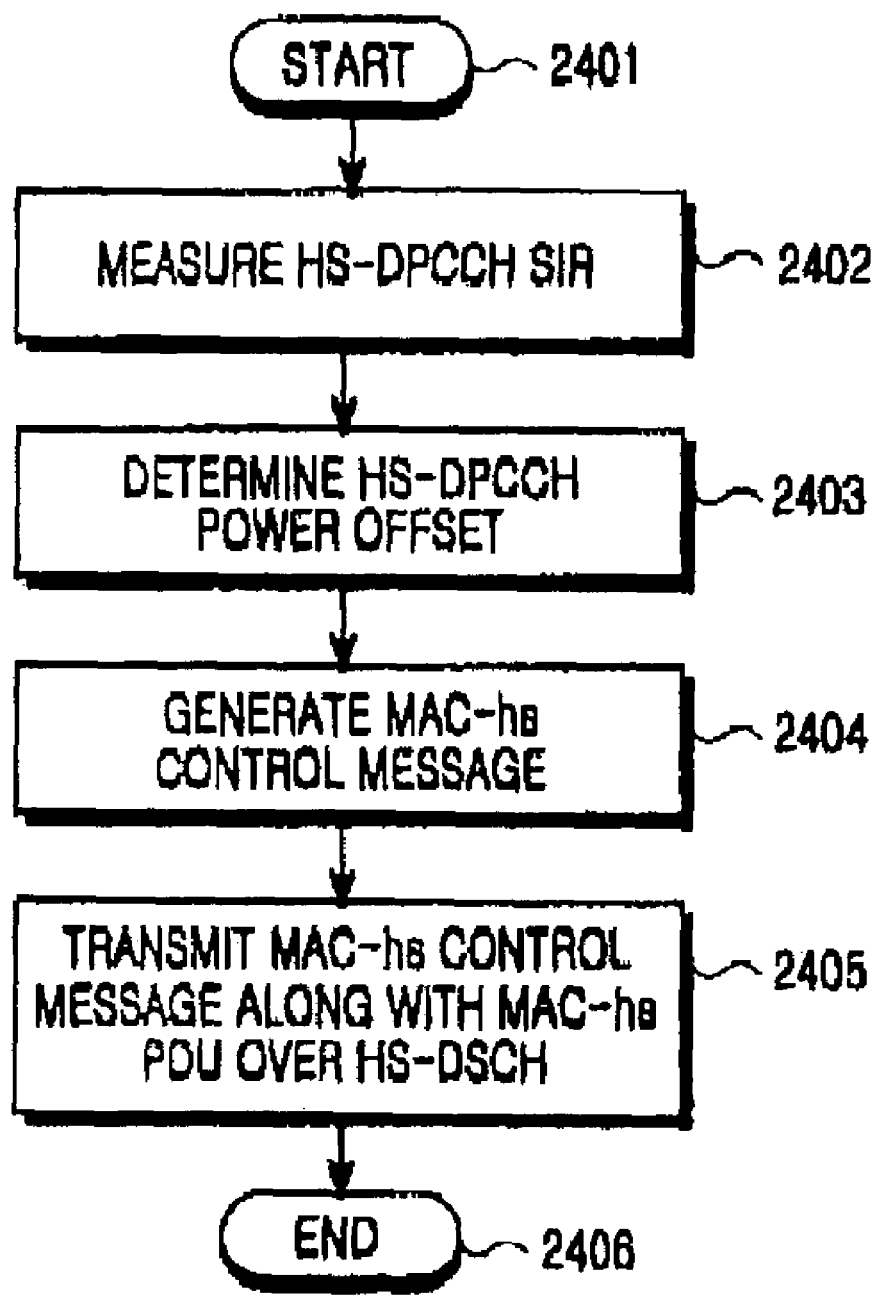
FIG. 24 illustrates a control flow performed by a Node B according to the second embodiment of the present invention.
Figure 25:
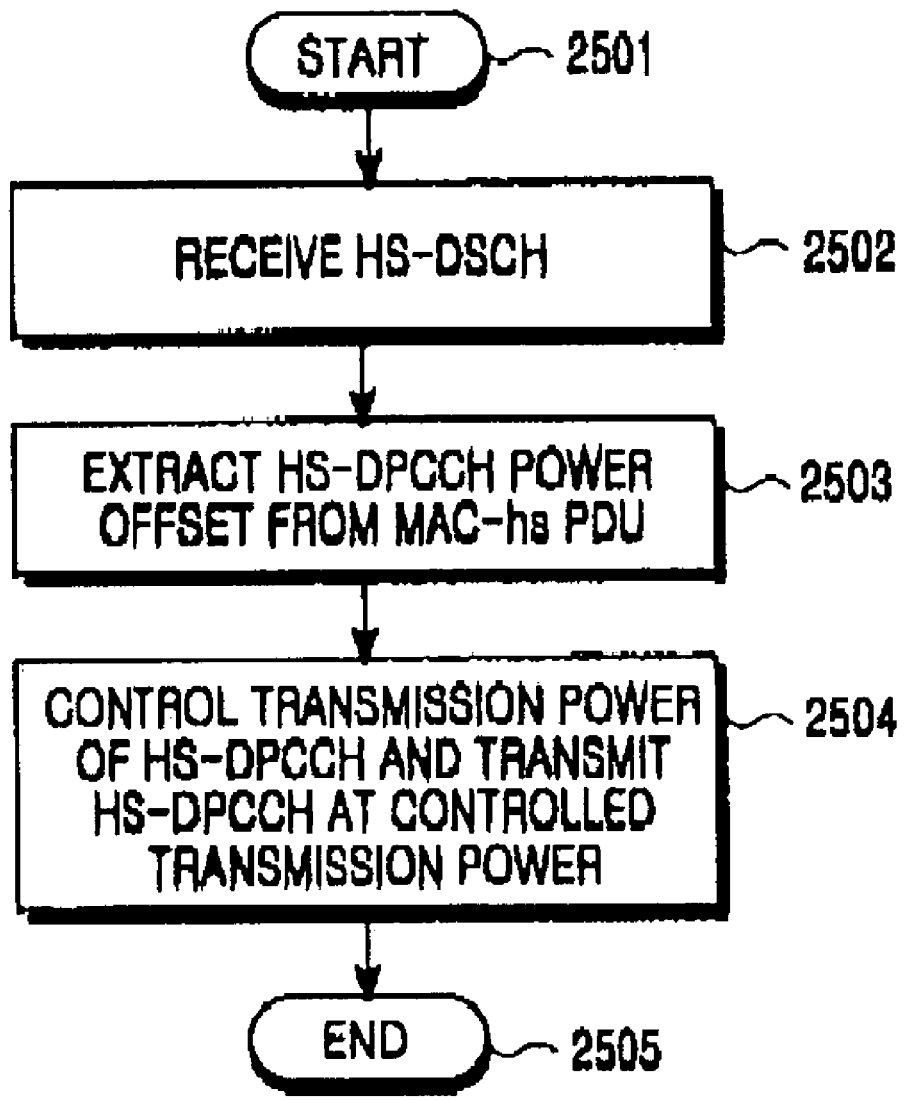
FIG. 25 illustrates a control flow performed by a UE according to the second embodiment of the present invention.

FIGS. 24 and 25 illustrate control flows performed by a Node B and a UE, respectively, to handle an uplink power offset value according to the second embodiment of the present invention.

Specifically, FIG. 24 illustrates a control flow for determining by a Node B an uplink power offset value and informing a UE of the uplink power offset value. Referring to FIG. 24, beginning at step 2401, a Node B measures an SIR of a received HS-DPCCH in step 2402. The Node B compares in step 2403 the measured SIR with a target SIR, and determines power offset bits for HS-DPCCH in the manner described in conjunction with FIG. 17 and Table 3, based on the comparison result. In step 2404, the Node B generates a MAC-hs control message for transmitting the power offset bits. An example of the MAC-hs control message is illustrated in FIG. 20. The Node B generates MAC-hs PDU by combining packet data provided from an upper layer with the MAC-hs control message. An example of the MAC-hs PDU is illustrated in FIGS. 18 and 19. Thereafter, in step 2405, the Node B performs encoding and interleaving on the MAC-hs PDU, transmits the interleaved MAC-hs PDU to a UE over HS-DSCH, and then ends the entire operation in step 2406.

FIG. 25 illustrates a control flow for processing an uplink power offset value by a UE. Referring to FIG. 25, beginning at step 2501, a UE receives an HS-DSCH transmitted by a Node B in step 2502. Thereafter, in step 2503, the UE extracts a power offset value from MAC-hs PDU received over the HS-DSCH. In step 2504, the UE controls transmission power of HS-DPCCH based on the extracted power offset value, and transmits the HS-DPCCH at the controlled transmission power. In step 2505, the UE ends an entire operation of determining transmission power for an HS-DPCCH.

As described above, the present invention enables direct exchange of control information such as uplink transmission power assigned to a UE, between a Node B and a UE in an HSDPA mobile communication system. By enabling the direct exchange of control information between the Node B and the UE, it is possible to decrease signal delay between the Node B and the UE and reduce Iub transmission resources, contributing to an improvement in system performance. Furthermore, it is possible to flexibly control uplink transmission power when transmitting a power offset over a MAC-hs PDU.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting by a radio network controller (RNC) a power offset for controlling transmission power of an uplink high-speed dedicated physical control channel (HS-DPCCH) when a user equipment (UE) enters a handover region, in a mobile communication system including the RNC, a Node B connected to the RNC, and the UE located in one of at least two cell areas occupied by the Node B, wherein the Node B transmits data to the UE over a high-speed downlink shared channel (HS-DSCH) and the UE transmits a response information indicating reception status of the data to the Node B over the uplink HS-DPCCH, the method comprising the steps of:

informing the UE of a power offset;

determining a transmission power increment of the uplink HS-DPCCH, if it is determined that the UE is located in the handover region;

informing the Node B of the power offset; and determining by the Node B a threshold value for determining the response information received from the UE, depending on the power offset.

2. The method of claim 1, wherein the power offset is transmitted to the UE through a medium access control (MAC) message.

3. The method of claim 2, wherein the MAC message serves as an active set update message.

4. The method of claim 1, wherein the power offset is transmitted to the Node B through a Node B application part (NBAP) message.

5. The method of claim 4, wherein the NBAP message serves as a radio link reconfiguration request message.

6. The method of claim 1, wherein the power offset is transmitted to the Node B, using a frame protocol.

7. The method of claim 6, wherein when using the frame protocol, the RNC transmits the power offset to the Node B through a spare field of a control frame.

8. The method of claim 6, wherein when using the frame protocol, the RNC inserts the power offset into spare bits in a header field of a data frame and transmits the power offset-inserted data frame to the Node B.

9. The method of claim 1, wherein the response information is defined as one of an acknowledgement (ACK) and a negative acknowledgement (NACK), and provides different power offsets for the ACK and the NACK.

10. The method of claim 9, wherein a transmission power increment based on the power offset is the response information, and a transmission power increment when the response information received from UE is defined as the NACK is greater than a transmission power increment when the response information is defined as the ACK.

11. The method of claim 1, wherein the uplink HS-DPCCH transmits channel quality indicator (CQI) information for a channel transmitted from the Node B to the UE and the response information, and provides different power offsets for the response information and the CQI information.

12. The method of claim 11, wherein a transmission power increment for the CQI information based on the power offset is greater than a transmission power increment for the response information.

13. An apparatus for transmitting and receiving a power offset for controlling transmission power of an uplink high-speed dedicated physical control channel (HS-DPCCH) when a user equipment (UE) enters a handover region, in a mobile communication system including a radio network controller (RNC), a Node B connected to the RNC, and the UE located in one of at least two cell areas occupied by the Node B, wherein the Node B transmits data to the UE over a high-speed downlink shared channel (HS-DSCH) and the UE transmits response information indicating reception status of the data to the Node B over the uplink HS-DPCCH, the apparatus comprising:

the RNC for informing the UE and the Node B of a power offset for determining a transmission power increment of the uplink HS-DPCCH, if it is determined that the UE is located in the handover region;

the UE for increasing transmission power of the uplink HS-DPCCH depending on the power offset, and transmitting the uplink HS-DPCCH at the increase transmission power; and the Node B for determining a threshold value depending on the transmission power of the uplink HS-DPCCH, estimated based on the power offset, and determining response information received from the UE depending on the threshold value.

14. The apparatus of claim 13, wherein the power offset is transmitted to the UE through a medium access control (MAC) message.

15. The apparatus of claim 14, wherein the MAC message serves as an active set update message.

16. The apparatus of claim 13, wherein the power offset is transmitted to the Node B through a Node B application part (NBAP) message.

17. The apparatus of claim 16, wherein the NBAP message serves as a radio link reconfiguration request message.

18. The apparatus of claim 13, wherein the power offset is transmitted to the Node B, using a frame protocol.

19. The apparatus of claim 18, wherein when using the frame protocol, the RNC transmits the power offset to the Node B through a spare field of a control frame.

20. The apparatus of claim 18, wherein when using the frame protocol, the RNC inserts the power offset into spare bits in a header field of a data frame and transmits the power offset-inserted data frame to the Node B.

21. The apparatus of claim 13, wherein the response information is defined as one of an acknowledgement (ACK) and a negative acknowledgement (NACK), and provides different power offsets for the ACK and the NACK.

22. The apparatus of claim 21, wherein a transmission power increment based on the power offset is the response information, and a transmission power increment when the response information is defined as the NACK is greater than a transmission power increment when the response information is defined as the ACK.

23. The apparatus of claim 13, wherein the uplink HS-DPCCH transmits channel quality indicator (CQI) information for a channel transmitted from the Node B to the UE and the response information, and provides different power offsets for the response information and the CQI information.

24. The apparatus of claim 23, wherein a transmission power increment for the CQI information based on the power offset is greater than a transmission power increment for the response information.

25. A method for controlling transmission power of an uplink high-speed dedicated physical control channel (HS-DPCCH) when a user equipment (UE) enters a handover region, in a mobile communication system including a radio network controller (RNC), a Node B connected to the RNC, and the UE located in one of at least two cell areas occupied by the Node B, wherein the Node B transmits data to the UE over a high-speed downlink shared channel (HS-DSCH) and the UE transmits a response information indicating reception status of the data to the Node B over the uplink HS-DPCCH, the method comprising the steps of:

transmitting to the RNC a report indicating that the UE enters the handover region;

receiving a power offset from the RNC through an active set update message in response to the report;

increasing transmission power of the uplink HS-DPCCH depending on the power offset; and transmitting the uplink HS-DPCCH at the increased transmission power.

26. The method of claim 25, wherein the response information is defined as one of an acknowledgement (ACK) and a negative acknowledgement (NACK), and provides different power offsets for the ACK and the NACK.

27. The method of claim 26, wherein a transmission power increment based on the power offset is the response information, and a transmission power increment when the response information is defined as the NACK is greater than a transmission power increment when the response information is defined as the ACK.

28. The method of claim 25, wherein the uplink HS-DPCCH transmits channel quality indicator (CQI) information for a channel transmitted from the Node B to the UE and the response information, and provides different power offsets for the information and the CQI information.

29. The apparatus of claim 28, wherein a transmission power increment for the CQI information based on the power offset is greater than a transmission power increment for the response information.

* * * * *